United States Patent
Badri et al.

(10) Patent No.: US 9,348,405 B2
(45) Date of Patent: May 24, 2016

(54) SYSTEMS AND TECHNIQUES FOR CONTROL OF STORAGE DEVICE POWER STATES

(71) Applicant: INTEL CORPORATION, Santa Clara, CA (US)

(72) Inventors: Assar Badri, Scottsdale, AZ (US); Dale J. Juenemann, North Plains, OR (US); Scott E. Burridge, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 175 days.

(21) Appl. No.: 14/140,321

(22) Filed: Dec. 24, 2013

(65) Prior Publication Data

US 2015/0177817 A1    Jun. 25, 2015

(51) Int. Cl.
*G06F 1/32*    (2006.01)

(52) U.S. Cl.
CPC ............ *G06F 1/3268* (2013.01); *G06F 1/3231* (2013.01)

(58) Field of Classification Search
CPC .................................................... G06F 1/3231
See application file for complete search history.

(56) References Cited

U.S. PATENT DOCUMENTS 8,325,995 B1 * 12/2012 Bowers .................... G06K 9/00
382/115
2004/0212677 A1 * 10/2004 Uebbing ................ H04N 7/181
348/155
2005/0071698 A1 * 3/2005 Kangas ................. G06F 1/3203
713/300
2012/0109455 A1 * 5/2012 Newman ............. G06F 3/03547
701/36

OTHER PUBLICATIONS

Costello, S, iPhone Sensors, About.com, retrieved Dec. 9, 2013, from http://ipod.about.com/od/ipodiphonehardwareterms/qt/iphone-sensors.htm?p=1, 1 page.
Appuous, Products—Keycard, retrieved Dec. 9, 2013, from http://www.appuous.com/products/mac/keycard.html, 5 pages.

* cited by examiner

*Primary Examiner* — Kim Huynh
*Assistant Examiner* — Eric Chang
(74) *Attorney, Agent, or Firm* — Schwabe, Williamson & Wyatt, P.C.

(57) ABSTRACT

Systems and techniques for control of storage device power states are described herein. In some embodiments, a control system for a storage device of a computing device may include receiver logic to receive a proximity signal indicative of a distance of a user from a proximity sensor, transition logic to determine that the proximity signal satisfies out-of-proximity criteria and generate an out-transition signal based at least in part on the determination that the proximity signal satisfies the out-of-proximity criteria, and state-change logic to cause a change in a power state of the storage device from a first power state to a second power state, in response to the out-transition signal, wherein the storage device consumes less power in the second power state than in the first power state. Other embodiments may be described and/or claimed.

29 Claims, 9 Drawing Sheets

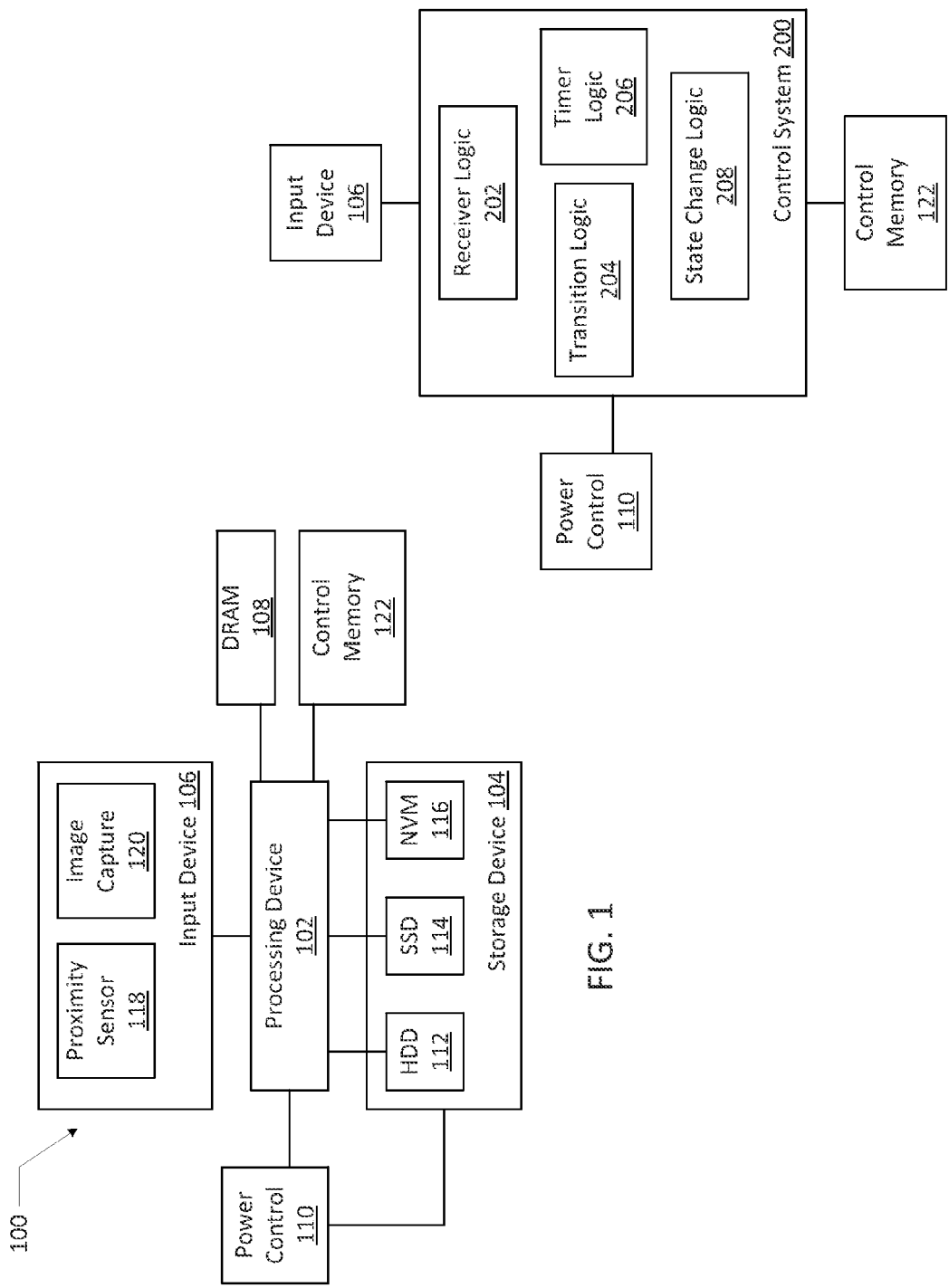

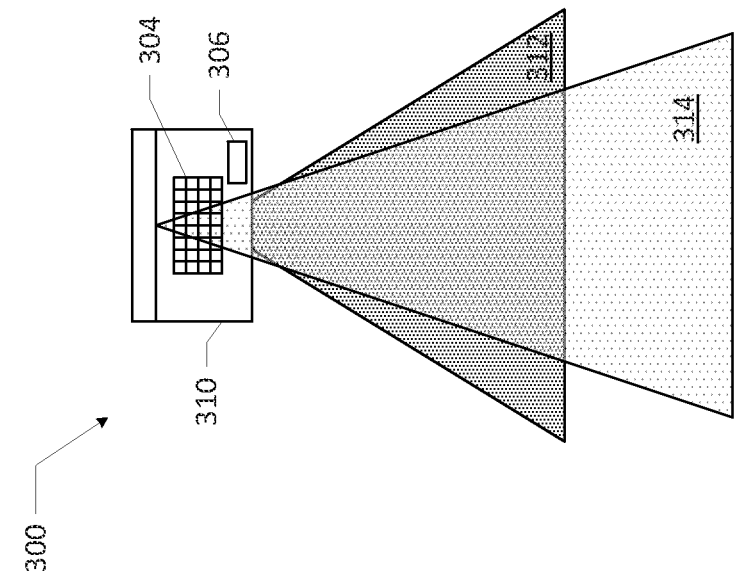
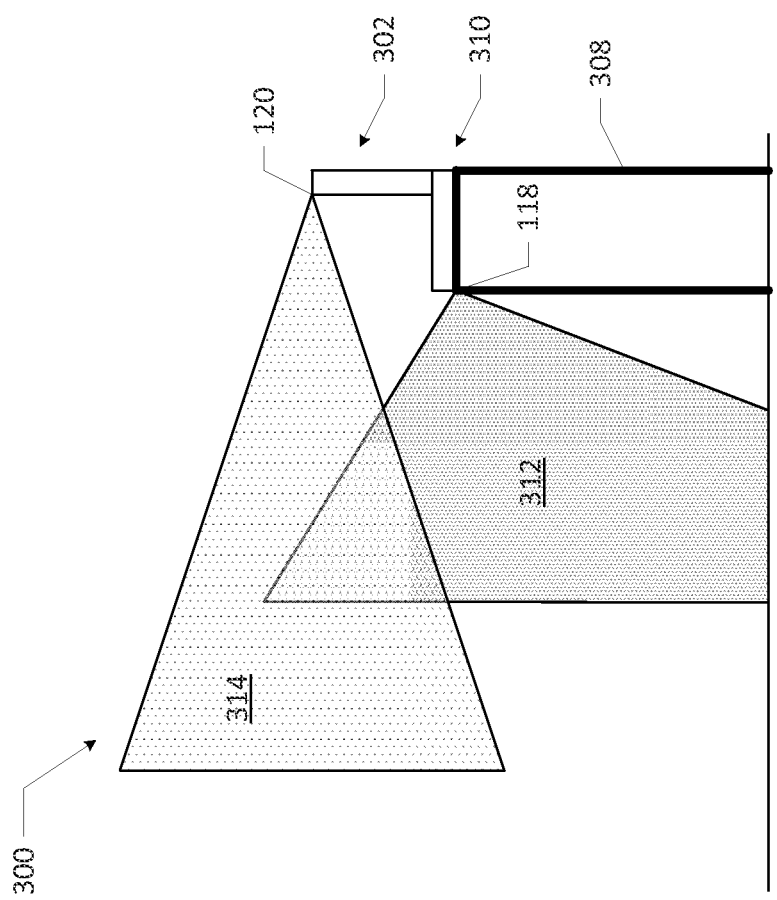

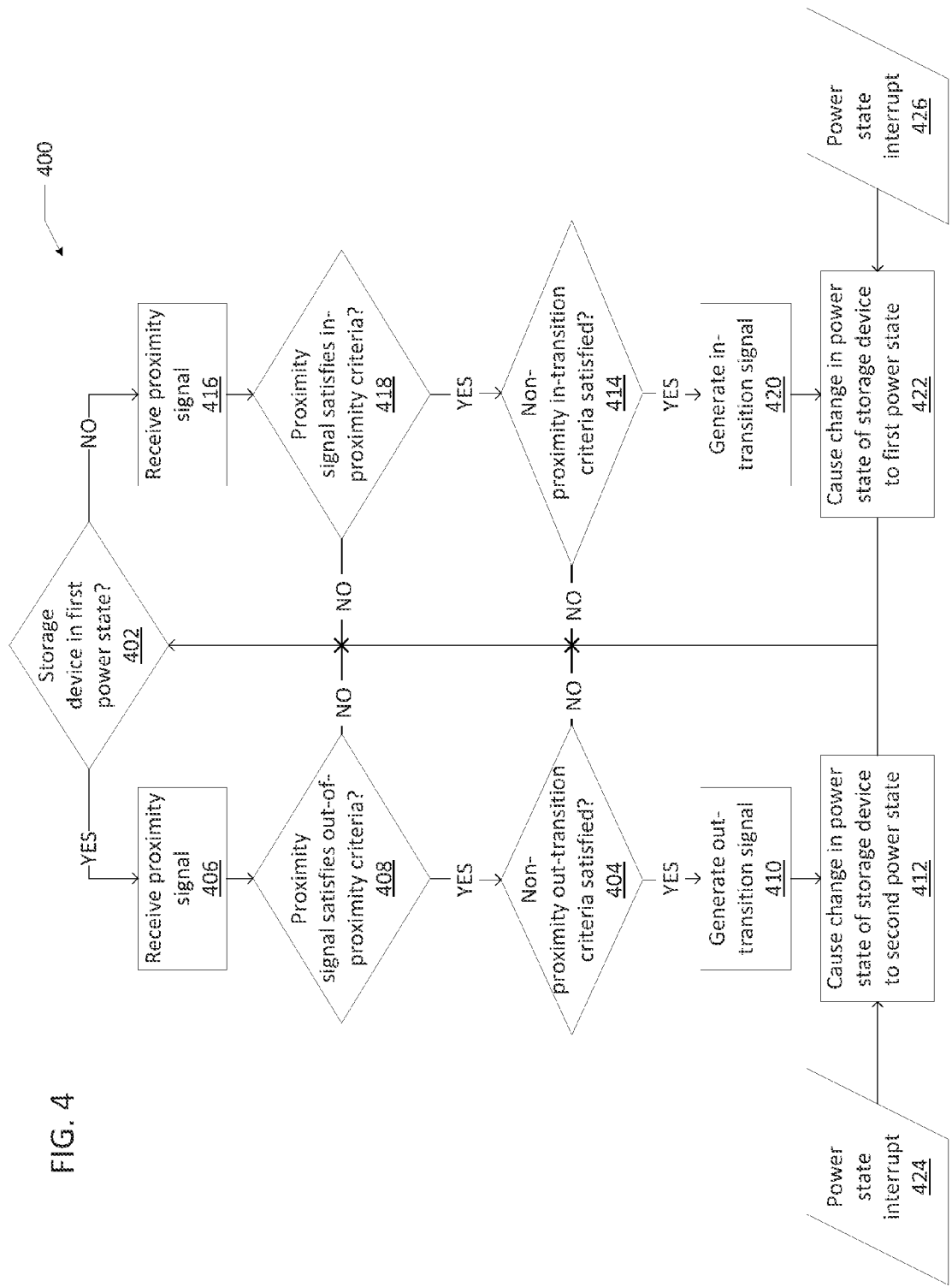

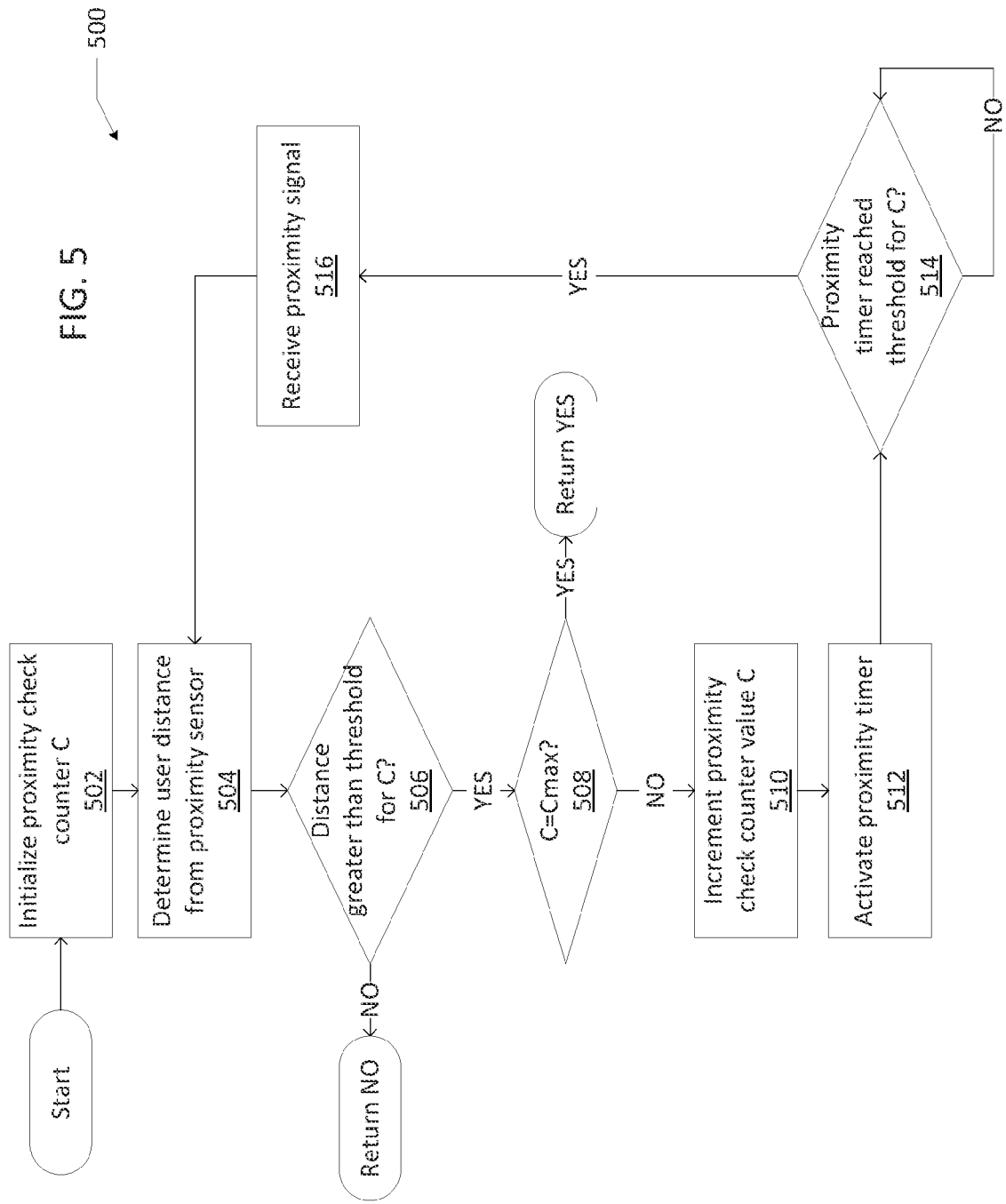

```
Transition(start=ACTIVE, end=STANDBY){
    Out-of-proximity_Criteria={
        Check={1,2,3}
        Timer_Thresholds={0,5,10}
        Distance_Thresholds={2,4,6}};
    Out-of-image_Criteria={}
    Other_Non-proximity_Criteria={No_Keyboard}
}                                                           ← 902

Transition(start=STANDBY, end=OFF){
    Out-of-proximity_Criteria={
        Check={1}
        Timer_Thresholds={0}
        Distance_Thresholds={8}};
    Out-of-image_Criteria={
        Check={1}
        Timer_Thresholds={5}
        Technique={Color_Detection}};
    Other_Non-proximity_Criteria={No_Keyboard}
}                                                           ← 904

Transition(start=OFF, end=ACTIVE){
    In-proximity_Criteria={
        Check={1}
        Timer_Thresholds={0}
        Distance_Thresholds={8}};
    In-image_Criteria={
        Check={1}
        Timer_Thresholds={1}
        Technique={Face_Recognition}};
    Other_Non-proximity_Criteria={Keyboard, Mouse, Touchscreen}
}                                                           ← 906
```

FIG. 9

SYSTEMS AND TECHNIQUES FOR CONTROL OF STORAGE DEVICE POWER STATES

TECHNICAL FIELD

The present disclosure relates generally to the field of storage devices, and more particularly, to control of storage device power states.

BACKGROUND

Many computing devices, such as personal desktop computers, include one or more nonvolatile storage devices, such as hard disk drives or solid-state drives. When the computing device is idle, the storage devices continue to consume energy, which may drain the battery and otherwise waste electricity. Some existing computing devices may be configured with operating systems that include different power management modes in which these storage devices may be turned off after a predetermined period of idle time. However, these existing devices may fail to reduce the power consumption of storage devices when the user is not engaged with the computing device, may turn the storage devices off when the user is engaged with the computing device, and/or may present an excessively long wait between the time that a user first attempts to "wake" a storage device and the time at which the storage device is ready for use.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the FIGS. of the accompanying drawings.

FIG. 1 is a block diagram of a computing device having a storage device and a processing device that may be configured as a control system for the storage device, in accordance with various embodiments.

FIG. 2 is a block diagram of a control system which may be implemented by the computing device of FIG. 1 to control the storage device, in accordance with various embodiments.

FIGS. 3A and 3B illustrate side and overhead views, respectively, of an arrangement of a proximity sensor and an image capture device in the computing device of FIG. 1, in accordance with various embodiments.

FIG. 4 is a flow diagram of a process for controlling a storage device, in accordance with various embodiments.

FIG. 5 is a flow diagram of a process for determining whether a proximity signal satisfies out-of-proximity criteria, in accordance with various embodiments.

FIG. 9 illustrates various criteria that may be used by the storage device power state control system of FIG. 2, in accordance with various embodiments.

DETAILED DESCRIPTION

Figure 6:
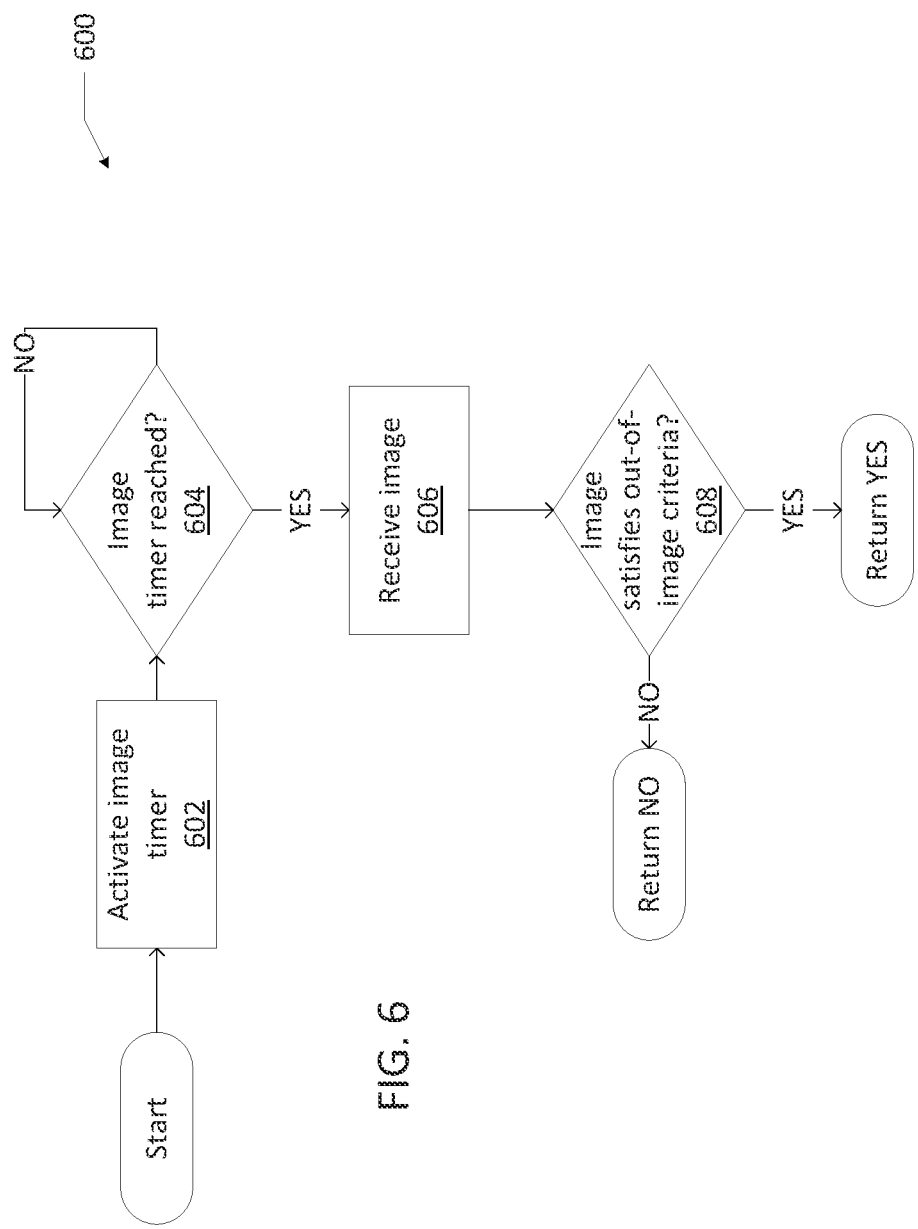
FIG. 6 is a flow diagram of a process for determining whether non-proximity out-transition criteria are satisfied, in accordance with various embodiments.

Systems and techniques for control of storage device power states are described herein. In some embodiments, a control system for a storage device of a computing device may include receiver logic to receive a proximity signal indicative of a distance of a user from a proximity sensor, transition logic to determine that the proximity signal satisfies out-of-proximity criteria and generate an out-transition signal based at least in part on the determination that the proximity signal satisfies the out-of-proximity criteria, and state-change logic to cause a change in a power state of the storage device from a first power state to a second power state, in response to the out-transition signal, wherein the storage device consumes less power in the second power state than in the first power state.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the disclosed embodiments. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description uses the phrases "in an embodiment," or "in embodiments," which may each refer to one or more of the same or different embodiments. Furthermore, the terms "comprising," "including," "having," and the like, as used with respect to embodiments of the present disclosure, are synonymous. The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other. As may be used herein, the term "logic" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

FIG. 1 is a block diagram of a computing device 100 having a storage device 104 (which may include one, two or more of the storage devices shown) and a processing device 102 that may be configured as a control system for the storage device 104, in accordance with various embodiments. In some embodiments the computing device 100 may be a desktop computer, a laptop computer, a tablet computer, a handheld computer, a gaming system or any other computing device. In some embodiments, the computing device 100 may include an ARM-based platform.

In some embodiments, the processing device 102 may be configured to control the storage device 104 based at least in part on signals received from the input device 106. In some embodiments, the processing device 102 may be configured to control the storage device 104 by causing changes in power state of the storage device 104. For example, the processing device 102 may generate control signals that may be transmitted to a power control device 110, which may adjust the power state of the storage device 104 in response. In particular, in some embodiments, the processing device 102 may be configured to receive a signal indicative of a distance of a user of the computing device 100 from the computing device 100, determine that the signal satisfies one or more out-of-proximity criteria, and cause a change in a power state of the storage device 104 to reduce the power consumption of the storage device 104.

In some embodiments, the power state of the storage device 104 may be related to or independent from one or more power management modes of the computing device 100. Each power management mode of the computing device 100 may specify a power state for different components of the computing device 100 (e.g., the storage device 104, one or more displays (not shown), the input device 106 or any other component of the computing device 100). For example, in an "active" power management mode, volatile memory, non-volatile memory, displays, and other devices may be fully powered. In a "sleep" power management mode, volatile memory may remain powered while power is cut to any volatile memory (e.g., causing "spin down" of any hard disk drives of the storage device 104), and power is cut or reduced to any displays. In a "hibernate" power management mode, data stored in volatile memory may be transferred to nonvolatile memory (e.g., of the storage device 104) in power may be cut to both volatile and nonvolatile memory, as well as cut or reduced to any displays. Rules governing when the computing device 100 should enter different power management modes may be implemented by an operating system of the computing device 100 (e.g., executed by the processing device 102). A user may also be able to manually select a power management mode.

In some embodiments, each power management mode may specify a power state for the storage device 104, but the specified power state may not be unique to the power management mode. For example, in the sleep and hibernate power management modes discussed above, hard disk drives included in the storage device 104 may be powered off in each mode; consequently, the power state of the storage device 104 in each mode may be the same. In some embodiments, the storage device power state control techniques and systems discussed herein may be used in conjunction with power management mode techniques, or may operate independently of power management mode techniques. For example, if an operating system of the computing device 100 is configured to transition to a particular power management mode under a particular set of conditions, and that power management mode specifies a power state for the storage device 104, the techniques disclosed herein may be used to override the power state specified by the power management mode, may be overridden by the power state specified by the power management mode, or may be incorporated into the set of conditions associated with the power management mode. As discussed below, the techniques disclosed herein may be applied independently or differently to different storage devices included in the storage device 104. For example, in some embodiments, the techniques disclosed herein may be applied to control the power state of one or more hard disk drives included in the storage device 104, while the power state of other storage devices (such as the solid state drive 114, discussed below) may be controlled using conventional power management mode techniques. The techniques and systems disclosed herein will largely refer to "the storage device 104" in the singular, but will be understood to be applicable to one or more storage devices included in the storage device 104. The various components of the computing device 100 are discussed in the following paragraphs.

The input device 106 may include one or more devices configured to provide a signal to the processing device 102. In some embodiments, the input device 106 may include a proximity sensor 118. The proximity sensor 118 may be configured to generate a proximity signal indicative of a distance of a user from the proximity sensor 118 in a proximity sensor coverage area. Examples of proximity sensor coverage areas are discussed below with reference to FIG. 3. In some embodiments, a proximity sensor coverage area may extend up to several meters from the proximity sensor 118. Various devices may serve as the proximity sensor 118. In some embodiments, the proximity sensor 118 may generate the proximity signal based at least in part on the receipt of electromagnetic radiation reflected off or radiated from the user. In some embodiments, the proximity sensor 118 may generate the proximity signal by sensing a physical presence of the user. In some embodiments, the proximity sensor may generate the proximity signal without contact between the user and the computing device 100 (e.g., without contact between a user and a touchscreen, mouse or keyboard included in the input device 106 (not shown)). In some embodiments, the proximity sensor may generate the proximity signal without wirelessly communicating with an electronic device in the user's possession (e.g., without wireless communication between a radio frequency (RF) tag and the computing device 100, or wireless communication between a Bluetooth tag and the computing device 100). In some embodiments, the proximity sensor 118 may be an infrared sensor.

The proximity sensor 118 may include one or more proximity sensors. For example, the proximity sensor 118 may include one or more infrared sensors. An infrared sensor included in the proximity sensor 118 may be an active infrared sensor or a passive infrared sensor. An active infrared sensor may include an infrared electromagnetic radiation emitter and an infrared electromagnetic radiation detector, and may detect the distance between the sensor and the user by measuring reflected infrared radiation from the emitter at the receiver. In some embodiments, an active infrared sensor may be an amplitude-based sensor, and may use the strength of the infrared signal received at the detector to determine the distance. In some embodiments, an active infrared sensor may be a time-based sensor, and may use the travel time of the infrared signal emitted and then received to determine the distance. In some embodiments, an active infrared sensor may have a power consumption on the order of 10 milliwatts. The longer the range of the active infrared sensor, the greater its power consumption. A passive infrared sensor may measure infrared electromagnetic radiation radiating from objects in the proximity sensor coverage area and use the measured radiation to determine distance. In some embodiments, a passive infrared sensor may have a power consumption on the order of 10 microwatts. In some embodiments, an infrared sensor included in the proximity sensor 118 may be small enough to be mounted in a display or casing of a tablet or laptop computing device.

In some embodiments, the proximity sensor 118 may include two or more infrared proximity sensors arranged at different angles such that each infrared proximity sensor covers a particular coverage area, and the combination of the two or more infrared proximity sensors covers a coverage area equal to the union of the particular coverage areas. In some embodiments, the proximity sensor 118 may be configured to generate a proximity signal in response to a trigger from the processing device 102. For example, in embodiments in which the proximity sensor 118 includes an electromagnetic radiation source and an electromagnetic radiation detector, the processing device 102 may signal to the proximity sensor 118 to activate the source and/or detector when a proximity signal is desired for use in controlling the storage device 104 (e.g., in accordance with the operation of the control system 200 discussed below with reference to FIG. 2). In some embodiments, the proximity sensor 118 may be configured to generate a proximity signal periodically, and may not respond to triggers from the processing device 102 or may generate proximity signals in response to triggers as well as periodically.

In some embodiments, the input device 106 may include an image capture device 120. The image capture device 120 may be configured to capture an image of an image capture coverage area proximate to the computing device 100. In some embodiments, the image capture device 120 may include a webcam (e.g., a stand-alone webcam or a webcam mounted in a laptop screen). The image capture device 120 may include one or more image capture devices. For example, the image capture device 120 may include two or more image capture devices arranged at different angles such that each image capture device covers a particular coverage area, and the combination of the two or more image capture device covers a coverage area equal to the union of the particular coverage areas. In some embodiments, the image capture device 120 may be configured to capture an image in response to a trigger from the processing device 102 (e.g., in accordance with the operation of the control system 200 discussed below with reference to FIG. 2).

The processing device 102 may be coupled with the input device 106, and may be configured to receive one or more signals from the input device 106 and analyze those signals to cause changes in the power state of the storage device 104. In some embodiments, the processing device 102 may include a central processing unit (CPU) and a chipset to manage the flow of data between the CPU and other components of the computing device 100. In some embodiments, the processing device 102 may be a system-on-a-chip (SoC). Additional details regarding various embodiments of the processing device 102 are discussed below with reference to FIG. 2.

The processing device 102 may be coupled with a dynamic random access memory (DRAM 108), which may store temporary instructions and data needed to complete operations of the processing device 102, for example. In some embodiments, when the computing device 100 enters a "sleep" power management mode, data stored in the DRAM 108 may be maintained in the DRAM 108. When the computing device 100 enters a "hibernate" power management mode, data stored in the DRAM 108 may be transferred to the storage device 104, and the DRAM 108 may be powered down (thereby losing any data previously stored in the DRAM 108).

The processing device 102 may be coupled with a control memory 122. The processing device 102 may store any desired parameters or instructions for performing any of the storage device control operations described herein in the control memory 122. For example, the control memory 122 may store any out-of-proximity criteria, in-proximity criteria, out-of-image criteria and in-image criteria used by the control system 200, as discussed below. The control memory 122 may include volatile memory, nonvolatile memory, removable media, or any desired type of memory in any desired memory location. For example, in some embodiments, the control memory 122 may include a portion of the DRAM 108. Particular examples of control-related data that may be stored in the control memory 122 for access by the processing device 102 are discussed in detail below with reference to FIG. 7. The control memory 122 may include a set of computational logic, which may include one or more copies of computer readable media having instructions stored therein which, when executed by the processing device 102, cause the computing device 100 to implement any of the techniques disclosed herein, or any portion thereof.

The processing device 102 may be coupled with the storage device 104, and may be configured to read and/or write data to the storage device 104. The storage device 104 may include any of a number of different types of storage devices, and may include none, one or more of each such type. In some embodiments, one or more of the different number and types of storage device included in the storage device 104 may be controlled by the processing device 102. For example, each storage device included in the storage device 102 may be controlled by a different embodiment of a control system, in accordance with any of the control system embodiments disclosed herein. In some embodiments, the storage device 104 may include one or more nonvolatile storage devices.

The storage device 104 may include a hard disk drive (HDD) 112. The HDD 112 may use a magnetic head to read and write data encoded in magnetic material on one or more rotating disks. The HDD 112 may include one or more spindle motors for rotating the disks and for moving the magnetic head during data read/write. The HDD 112 may include one or more HDDs, which may be jointly or independently controlled by a suitably configured processing device 102, in accordance with the techniques disclosed herein. Read and/or write operations to the HDD 112 may be executed using a communication protocol, such as Serial Advanced Technology Attachment (SATA). In some embodiments, the HDD 112 may have four possible power states: an "ACTIVE" power state in which power is supplied to the one or more spindle motors to rotate the disks and the HDD 112 is servicing inputs and outputs (I/O, such as reads, writes, or other commands), an "IDLE" power state in which power is supplied to the one or more spindle motors to rotate the disks but no I/O commands are in progress, a "STANDBY" power state in which power is no longer supplied to the one or more spindle motors (causing the disks to spin down), and an "OFF" power state in which no power is consumed by the one or more spindle motors or any other components.

The storage device 104 may include a solid state drive (SSD) 114. The SSD 114 may include a controller configured to read and write data to a number of integrated circuit (IC) memory devices without the use of moving parts. The SSD 114 may include one or more SDDs, which may be jointly or independently controlled by a suitably configured processing device 102, in accordance with the techniques disclosed herein. Read and/or write operations to the SSD 114 may be executed using a communication protocol, such as Peripheral Component Interconnect Express (PCIe). In some embodiments, the SSD 114 may have four possible power states: an "ACTIVE" power state in which power is supplied to the SSD 114 and the SSD 114 is servicing I/O, an "IDLE" power state in which power consumption is reduced but the SSD 114 is ready to receive commands and service I/O with a minimal amount of latency, a "SLEEP" power state in which a controller and/or storage components of the SSD 114 are powered off and a minimal amount of interface circuitry remains powered to wake the SSD 114 when needed, and an "OFF" power state in which no power is consumed by the SSD 114.

The storage device 104 may include other nonvolatile memory (NVM) 116. For example, the NVM 116 may include an e-Multimedia Card (eMMC), which may include a controller and flash memory in a ball grid array (BGA) package for embedding in IC devices. The NVM 116 may include one or more NVMs, which may be jointly or independently controlled by a suitably configured processing device 102, in accordance with the techniques disclosed herein. Read and/or write operations to the NVM 116 may be executed using a communication protocol, such as an eMMC serial protocol. In some embodiments, the NVM 116 may have four possible power states: an "ACTIVE" power state in which power is supplied to the NVM 116 and the NVM 116 is servicing I/O, an "IDLE" power state in which power consumption is reduced but the NVM 116 is ready to receive commands and service I/O with a minimal amount of latency, a "SLEEP" power state in which most of the NVM 116 is powered off and minimal logic remains powered to respond to reset or sleep/wake commands, and an "OFF" power state in which no power is consumed by the NVM 116.

The computing device 100 may include the power control device 110, which may be coupled with the processing device 102 and the storage device 104. In some embodiments, the power control device 110 may be configured to receive a command from the processing device 102 to change a power state of the storage device 104. The storage device 104 may consume less power after the change in power state, or more power after the change in power state, depending on the command received from the processing device 102. In some embodiments, the power control device 110 may include one or more switches coupled between the storage device 104 and a power supply (not shown). The power control device 110 may control the one or more switches to control the power supplied to the storage device 104, in response to command signals from the processing device 102. For example, in some embodiments, the power control device 110 may be configured to supply power to the HDD 112 in a first power state, and cut power to the HDD 112 in a second power state (resulting in lower power consumption in the second power state than in the first power state). In some embodiments, the power control device 110 may be a driver for one or more components of the storage device 104.

FIG. 2 is a block diagram of a control system 200 which may be implemented by the processing device 102 to control the storage device 104 of the computing device 100 (FIG. 1). As discussed above, the control system 200 may be coupled with the input device 106, the power control device 110 in the control memory 122. The control system 200 may include receiver logic 202, transition logic 204, timer logic 206 and state-change logic 208.

The receiver logic 202 may be coupled with the input device 106, and may be configured to receive a proximity signal from the proximity sensor 118. The proximity signal may be indicative of a distance of the user from the proximity sensor 118, as discussed above.

The transition logic 204 may be coupled with the receiver logic 202, and may be configured to determine that the proximity signal (received by the receiver logic 202) satisfies one or more out-of-proximity criteria. The out-of-proximity criteria may indicate that a user of the computing device 100 is no longer in the proximity of the computing device 100, and therefore not likely to be using the computing device 100. As used herein, the term "proximity" may refer to the range of distance around a computing device in which a user may be present to effectively use the computing device. The size and shape of a region "proximate" to a particular computing device may depend on the type of computing device, the environment in which the computing device is situated, any peripherals being used with the computing device and/or any other suitable factors. In some embodiments, the transition logic 204 may determine that the proximity signal satisfies the out-of-proximity criteria upon determining that the proximity signal indicates that the user is located at a distance farther than a threshold distance away from the proximity sensor 118 (or from any other suitable landmark associated with the computing device 100). A number of examples of out-of-proximity criteria are discussed herein.

The transition logic 204 may also be configured to generate an out-transition signal based at least in part on the determination of the proximity signal satisfies the out-of-proximity criteria. In some embodiments the transition logic 204 may generate the out-transition signal upon determination that the proximity signal satisfies the out-of-proximity criteria, while in other embodiments, the transition logic 204 may require additional conditions before generating the out-transition signal.

Some such conditions may be timer-based. In some embodiments the transition logic 204 may be coupled with timer logic 206. The timer logic 206 may be configured to implement one or more timers, which may count down or up in order to indicate whether a predetermined amount of time has elapsed from activation of the timer. The timer logic 206 may include one or more oscillators, memory devices, and any additional timer components known in the art. In some embodiments, the transition logic 204 may be configured to trigger the timer logic 206 to activate a proximity timer based at least in part on the determination by the transition logic 204 that the proximity signal satisfies the out-of-proximity criteria. In some such embodiments, the transition logic 204 may be configured to generate the out-transition signal based at least in part on the proximity timer reaching a threshold value. The use of timers and various embodiments disclosed herein may build some amount of hysteresis into the operation of the control system 200, which may avoid undesired changes in state that may be caused by intermittent and unpredictable human or other movements around the computing device 100, as detected by the proximity sensor 118 or others of the input device 106.

In some embodiments, the transition logic 204 may be configured to determine that the proximity signal (received by the receiver logic 202) satisfies one or more in-proximity criteria. The in-proximity criteria may indicate that a user of the computing device 100 in the proximity of the computing device 100, and therefore likely to be using the computing device 100 or intending to use the computing device 100 in the near future. In some embodiments, the transition logic 204 may determine that the proximity signal satisfies the in-proximity criteria upon determining that the proximity signal indicates that the user is located at a distance less than a threshold distance away from the proximity sensor 118 (or from any other suitable landmark associated with the computing device 100).

In some embodiments, the in-proximity criteria may be complementary to the out-of-proximity criteria discussed above. For example, the transition logic 204 may determine that the proximity signal satisfies the out-of-proximity criteria when the user is determined to be greater than 6 feet away from the proximity sensor 118, and may determine that the proximity signal satisfies the in-proximity criteria when the user is determined to be less than 6 feet away from the proximity sensor 118. In some embodiments the in-proximity criteria are not complementary to the out-of-proximity criteria, and indeed, may be overlapping. For example, the transition logic 204 may determine that the proximity signal satisfies the out-of-proximity criteria when the user is determined to be greater than 6 feet away from the proximity sensor 118, and may determine that the proximity signal satisfies the in-proximity criteria when the user is determined to be less than 8 feet away from the proximity sensor 118. Because the transition logic 204 may be evaluating the proximity signal against the out-of-proximity criteria in the in-proximity criteria under different circumstances, this overlap may not create a conflict for the transition logic 204. A number of examples of in-proximity criteria are discussed herein.

The transition logic 204 may also be configured to generate an in-transition signal based at least in part on the determination of the proximity signal satisfies the in-proximity criteria. In some embodiments the transition logic 204 may generate the in-transition signal upon determination that the proximity signal satisfies the in-proximity criteria, while in other embodiments, the transition logic 204 may require additional conditions before generating the in-transition signal (e.g., a timer-based condition, as discussed above).

As noted above, the control system 200 may include state-change logic 208. The state-change logic 208 may be coupled with the transition logic 204 and may be configured to cause a change in the power state of the storage device 104 based at least in part on an out-transition signal or an in-transition signal generated by the transition logic 204. In some embodiments, based at least in part on an out-transition signal generated by the transition logic 204, the state-change logic 208 may cause the power state of the storage device 104 to change from a first power state to a second power state in which the storage device 104 consumes less power than in the first power state. In some embodiments, based at least in part on and in-transition signal generated by the transition logic 204, the state-change logic 208 may cause the power state of the storage device 104 to change from the second power state to the first power state. The terms "first power state" and "second power state" are used herein to refer to power states of the storage device 104 having different power consumptions, but the storage device 104 may have two or more different power states. The techniques and systems disclosed herein may be used to change between any number of power states, and are not limited to two power states. In particular, the techniques and systems disclosed herein for changing from a first power state to a second, lower consumption power state may be used to change from any power state to a lower consumption power state, and may skip a power state in between or may be applied serially to make multiple changes in power state. Similarly, the techniques and systems disclosed herein for changing from a second power state to a first, higher consumption power state may be used to change from any particular power state to a higher consumption power state, and may skip a power state in between or may be applied serially to make multiple changes in power state.

In some embodiments, the transition logic 204 may be configured to generate out and in-transition signals using signals other than a proximity signal from the proximity sensor 118, instead of or in addition to a proximity signal. For example, in some embodiments, the receiver logic 202 may be configured to receive an image from the image capture device 120 (as discussed above) and the transition logic 204 may be configured to determine that the image satisfies out-of-image criteria or in-image criteria. The transition logic 204 may be configured to generate the out-transition signal based at least in part on a determination that the image satisfies the out-of-image criteria (e.g., instead of or in addition to the determination that the proximity signal satisfies the out-of-proximity criteria). The transition logic 204 may be configured to generate the in-transition signal based at least in part on a determination that the image satisfies the in-image criteria (e.g., instead of or in addition to the determination that the proximity signal satisfies the in-proximity criteria). In some embodiments, the in-image criteria may include the detection of a human body shape in the image capture coverage area of the image. In some embodiments, the out-of-image criteria may include the detection of the absence of a color or pattern of garment associated with the user in the image. The image capture coverage area may or may not overlap with the proximity sensor coverage area. For example, FIGS. 3A and 3B illustrate side and overhead views, respectively, of an embodiment 300 of the proximity sensor 118 and an image capture device 120 in the computing device 100. In particular, the computing device 100 of the embodiment 300 is shown as an open laptop computing device positioned on a table 308. The image capture device 120 is shown as positioned at a top of a display 302 of the computing device 100, while the proximity sensor 118 is shown as positioned at a front edge of a base 310 of the computing device 100. The base 310 may include a keyboard 304 and/or a touchpad 306. The proximity sensor coverage area 312 is shown as overlapping with the image capture coverage area 314.

Timer-based conditions related to images received by the receiver logic 202 may also be used by the transition logic 204 to generate the in and out-transition signals as discussed above with respect to the proximity signal. A number of examples of in image and out-of-image criteria are discussed herein. For example, in some embodiments, the transition logic 204 may be configured to activate an image timer implemented by the timer logic 206 based at least in part on a determination by the transition logic 204 that the proximity signal satisfies the out-of-proximity criteria. The image capture device 120 may be configured to capture the image in response to the image timer reaching a threshold value.

The image capture device 120 may be capable of capturing images at two or more different resolutions. In some such embodiments, when the image capture device 120 captures an image that is to be used for storage device control purposes by the control system 200, the image capture device 120 may capture a low resolution image and provide that image to the receiver logic 202. This low resolution image may have a resolution that is lower than the maximum achievable resolution of the image capture device 120 and may be lower than any user-configurable resolution. For example, a user may be able to configure the image capture device 120 to capture images at 320×240, 640×480, or 480×720 pixels. In some embodiments, images captured by the image capture device 120 may be used by the control system 200 may be captured at the lowest user configurable resolution (here, e.g., 320× 240) or a lower resolution (e.g., 160×120 or lower).

The choice of what types of proximity sensor to include in the proximity sensor 118, and whether or not to use additional input devices (such as the image capture device 120), for storage device power state control purposes may be based on a desired balance between the accuracy of detecting a user's presence and the power required to operate the input devices and process the data that they generate. For example, embodiments of the control system 200 may be configured to receive a frequent stream of high resolution images from the image capture device 120, perform sophisticated pattern recognition on these images to identify and recognize the facial features of a particular user, and cause changes in the power state of the storage device 104 based on the results of this recognition (e.g., by only changing power state when the user's presence is detected or absent from the processed images). However, the amount of power required to capture and process these images may be substantial, and may undercut or outweigh the power savings gained in causing the storage device 104 to transition to a lower power state. In some embodiments, no image processing may be performed by the control system 200 for controlling power states of the storage device 104.

In another example, as noted above, the proximity sensor 118 may generate the proximity signal without wirelessly communicating with an electronic device in the user's possession (e.g., without wireless communication between an RF tag and the computing device 100, or wireless communication between a Bluetooth tag and the computing device 100). Performing user presence detection using Bluetooth or similar wireless communications may be significantly more power intensive than using an infrared or other proximity sensor, and thus any Bluetooth or similar approaches to "waking" a computing device may not achieve the power saving purposes described herein. Additionally, such approaches require the user to maintain possession of a Bluetooth or other tag, and to keep that tag in a position that is readily detectable by the computing device 100; if the tag is lost, stolen or otherwise inappropriately positioned, the control system that relies on detection of this tag will fail.

Since the proper choice of input devices and analysis techniques must weigh the energy expenditure against the potential energy savings, a number of the embodiments disclosed herein may provide a range of possible implementations to tune this balance. For example, configuring the computing device 100 to capture and use a lower resolution image captured by the image capture device 120 may require less power than capturing and using a higher resolution image. The frequency of image capture and proximity sensor readings may also be adjusted. As discussed below, in some embodiments, more power intensive techniques may be used as a final check after lower power techniques have established that it is likely that a user is no longer in the presence of the computing device 100 or has come into the presence of the computing device 100. Variations of this kind are within the scope of the systems and techniques disclosed herein.

The techniques and systems disclosed herein may have a number of advantageous features. The storage subsystems of computing platforms may be one of the largest consumers of power in the platform, and thus techniques for saving power in the subsystems may substantially reduce the burden on batteries and more broadly reduce the environmental footprint of these platforms. In some embodiments, a power switch (e.g., the power control device 110) of a computing platform may be controlled by hardware configured with software to implement a storage device power control technique (e.g., as described above with reference to the control system 200) using signals from sensors included in the computing device 100 (e.g., the proximity sensor 118), thereby adjusting the power consumed by one or more storage devices (e.g., the storage device 104).

Existing approaches typically involve hardware or software configured to "guess" when the user is actively utilizing a computing device based on, for example, fixed idle timeout values (e.g., a fixed time during which no touchscreen activity is detected) and thereby initiate low-power states. These approaches may fail to transition a storage device to a low power state when the user is not using the device (resulting in excess energy consumption and sub-optimal battery life). The limited amount of information used by these approaches may also result in undesirably transitioning a device that is in use to a low power state (e.g., when the user is reading text or studying an image on a display), causing the computing device to seem unresponsive as the storage device returns to a higher power state and thereby frustrating the user. These existing approaches are often further constrained by predefined operating system power policies which are defined by default or by a user (e.g., "High Power," "Balanced" or "Power Saver" policies) and do not take into consideration the user's behavior beyond conventional fixed idle timeout values. Existing approaches using timer-based transitions to low-power states may thus be ineffective, dissatisfying for the user, or both.

The systems and techniques disclosed herein may enable more aggressive and intelligent storage device power management. For example, in some embodiments, a laptop or tablet computing device may be configured to detect whether a user is within a particular area proximate to the computing device, and may transition a storage device of the computing device to a low power state upon determining that the user is not present in the area for a threshold amount of time. In some embodiments, the control system 200 may detect a user leaving the proximity of the computing device 100 and returning to the proximity of the computing device 100, and may enable the storage device 104 to be transition to a lower power state in the interim during intervals which would be too short for traditional timer-based approaches. Because HDD's may consume up to approximately 80% or more of the power expended by a computing device during idle (depending on the specifics of the platform), the techniques and systems disclosed herein may be particularly advantageous when applied to the control of HDDs (e.g., the HDD 112). In particular, power savings of up to 500 or 400 milliwatts or greater may be achieved when HDDs are transitioned into "OFF" or "STANDBY" power states when idle, respectively (e.g. for 2.5 inch mobile HDDs), representing a substantial amount of power saving potential (which may translate to 45 minutes of battery life, or more, for a laptop computing device). Since wake latency (discussed below) is similar for an HDD from the "OFF" and "STANDBY" power states, the systems and techniques disclosed herein may allow storage devices to be brought to minimum power states while idle without sacrificing wake time. Although the power savings expected for HDDs may be one to two orders of magnitude greater than the power savings expected for SSDs, the benefits of using the systems and techniques disclosed herein to control the power state of an SSD may also be significant.

In embodiments in which the techniques and systems disclosed herein are used to bring the storage device 104 from a second, lower power state to a first power state (e.g., a fully powered state), the use of proximity sensors (such as the proximity sensor 118) to initiate the change in state may "hide" the time it takes to "wake" the computing device 100 from the user by beginning the wake sequence before the user has made physical contact with the computing device 100. This wake latency increases as storage devices transition from lower power state to a fully powered state (and, to bring a magnetic disk of an HDD to 5400 or 7200 rotations per minute, may be on the order of 3 to 8 seconds), and has typically resulted in increasing frustration for users as devices become more power efficient. By using "presence" of a user, as detected by a proximity sensor, to initiate changes in power state, the techniques and systems disclosed herein may mitigate the trade-off between the efficiency of low-power states of storage devices and quick wake time.

The techniques and systems disclosed herein may be advantageously applied in computing devices that include small SSDs operating as caches for HDDs, as well as hybrid technologies that combine SSD and HDD features, such as solid state hybrid drives (SSHDs). In some such embodiments, the cache may be used instead of accessing the HDD for a majority of I/O operations. The use of the cache may create opportunities for time windows having durations in the multiple minutes where no HDD access may be required and thus an HDD may be transitioned into a lower power state (e.g., spun down or powered off). However, a single miss of the cache during operation of a computing device may require HDD access, which can result in a multi-second system stall while the HDD spins up and becomes ready. These lags can negatively impact the user experience. Use of proximity sensors to detect when a user is near his or her computing device and to automatically change the power state of a storage device (such as the HDD 112 or the SDD 114) may reduce the occasions on which the user is subject to HDD or SSD power-on delay in these embodiments, and may allow energy saving when appropriate.

The potential for the use of proximity sensors and other devices to enable more aggressive power management of storage devices has not been previously recognized. At best, some smartphone devices may include a proximity sensor that is used to disable touchscreen capability when the user receives a call and brings the smartphone to his or her ear to talk. The purpose of this disabling is to prevent accidental activation of elements of the user interface on the touchscreen, and to turn off the touchscreen display when not needed. The configuration of the smartphones has the effect of disabling display components when the user is detected to be so close to the smartphone that the display might be accidentally activated. Proximity sensors have not been utilized or appreciated in devices that include hard disk drives or solid-state drives, such as desktop or laptop computers.

FIG. 4 is a flow diagram of a process 400 for controlling a storage device, in accordance with various embodiments. It may be recognized that, while the operations of the process 400 (and the other processes described herein) are arranged in a particular order and illustrated once each, in various embodiments, one or more of the operations may be repeated, omitted or performed out of order. For illustrative purposes, operations of the process 400 may be described as performed by the control system 200 (FIG. 2) as instantiated in the computing device 100 (FIG. 1), but the process 400 may be performed by any suitably configured device (e.g., a programmed processing system, an ASIC, or another computing device).

At the operation 402, the control system 200 may determine whether the storage device 104 is in a first power state. The first power state may be a power state in which more power is consumed than a second possible power state of the storage device 104. Thus, at the operation 402, the control system 200 may determine whether there is a lower power state achievable for the storage device 104. The operation 402 may be performed by the state-change logic 208, for example.

If the control system 200 determines at the operation 402 that the storage device 104 is in the first power state (and that therefore the storage device 104 would consume less power if transitioned to the second power state), the control system 200 may proceed to the operation 404 and receive a proximity signal. The proximity signal may be generated by the proximity sensor 118 and may be indicative of a distance of a user from the proximity sensor 118 within a proximity sensor coverage area. The operation 404 may be performed by the receiver logic 202, for example. Proximity signals received at the operation 404 may be generated by the proximity sensor 118 at periodic intervals (e.g., every 30 seconds). Consequently, in some embodiments, the operation 404 may only be performed at these periodic intervals.

At the operation 406, the control system 200 may determine whether the proximity signal (received at the operation 404) satisfies the out-of-proximity criteria. Various embodiments of out-of-proximity criteria are described elsewhere herein; and illustrative embodiment of the operation 406 is discussed below with reference to FIG. 5. The operation 406 may be performed by the transition logic 204, for example. If the control system 200 determines at the operation 406 that the proximity signal does not satisfy the out-of-proximity criteria, the control system 200 may return to the operation 402 and determine whether the storage device 104 is in a first power state.

If the control system 200 determines that the operation 406 that the proximity signal satisfies the out-of-proximity criteria, the control system 200 may determine whether non-proximity out-transition criteria are satisfied at the operation 408. Examples of non-proximity out-transition criteria may include the image-based criteria discussed above (e.g., the out-of-image criteria) or conventional keyboard, touchpad or mouse usage criteria typically used in existing power management mode applications (e.g., the absence of user contact with a touchscreen for a predetermined amount of time). The operation 408 may be performed by the transition logic 204, for example. If the control system 200 determines at the operation 408 that the non-proximity out-transition criteria are not satisfied, the control system 200 may return to the operation 402 and determine whether the storage device 104 is in a first power state.

If the control system 200 determines at the operation 408 that the non-proximity out-transition criteria are satisfied, the control system 200 may proceed to the operation 410 and generate an out-transition signal. The operation 410 may be performed by the transition logic 204, for example. At the operation 412, the control system 200 may cause a change in the power state of the storage device 104 from the first power state to the second power state. The operation 412 may be performed by the state-change logic 208, for example.

In some embodiments, the power state of the storage device 104 may be changed from the first power state to the second power state in response to a power state interrupt (as indicated by the block 424). The power state interrupt of block 424 may be generated by another component of the computing device 100, and may override or complement the process 400. In some embodiments, the power state interrupt of block 424 may be generated in response to a software power off command instruction by the user or by a software or hardware component. In some embodiments, the power state interrupt of block 424 may be generated in response to an instruction by the user to turn a screen of the computing device 100 off. In some embodiments, the power state interrupt of block 424 may be generated in response to the expiration of an input/ output (I/O) timer. Any one or more of these interrupt sources, or any other suitable interrupt sources, may cause the storage device 104 to change to the second power state from the first power state, independent of the execution of the process 400.

Upon causing a change in the power state of the storage device 104 to the second power state at the operation 412, the control system 200 may return to the operation 402 and determine whether the storage device 104 is in the first power state.

If the control system 200 determines at the operation 402 that the storage device 104 is not in the first power state (and is instead in the second power state, and therefore that the storage device 104 would consume more power if transitioned to the first power state), the control system 200 may proceed to the operation 414 and receive a proximity signal (e.g., as discussed above with reference to the operation 404). The operation 414 may be performed by the receiver logic 202, for example. As noted above, in some embodiments, the operation 414 may only be performed at these periodic intervals. The periodicity of the operation 414 may be different from the periodicity of the operation 404.

At the operation 416, the control system 200 may determine whether the proximity signal (received at the operation 414) satisfies the in-proximity criteria. Various embodiments of in-proximity criteria are described elsewhere herein; and illustrative embodiment of the operation 416 is discussed below with reference to FIG. 7. The operation 416 may be performed by the transition logic 204, for example. If the control system 200 determines at the operation 416 that the proximity signal does not satisfy the in-proximity criteria, the control system 200 may return to the operation 402 and determine whether the storage device 104 is in a first power state.

If the control system 200 determines that the operation 416 that the proximity signal satisfies the in-proximity criteria, the control system 200 may determine whether non-proximity in transition criteria are satisfied at the operation 418. Examples of non-proximity in transition criteria may include the image-based criteria discussed above (e.g., the in-image criteria) or conventional keyboard, touchpad or mouse usage criteria typically used in existing power management mode applications (e.g., the detection of user contact with a touchpad). The operation 418 may be performed by the transition logic 204, for example. If the control system 200 determines at the operation 418 that the non-proximity in transition criteria are not satisfied, the control system 200 may return to the operation 402 and determine whether the storage device 104 is in a first power state.

If the control system 200 determines at the operation 418 that the non-proximity in transition criteria are satisfied, the control system 200 may proceed to the operation 420 and generate an in-transition signal. The operation 420 may be performed by the transition logic 204, for example. At the operation 422, the control system 200 may cause a change in the power state of the storage device 104 from the second power state to the first power state. The operation 422 may be performed by the state-change logic 208, for example.

In some embodiments, the power state of the storage device 104 may be changed from the second power state to the first power state in response to a power state interrupt (as indicated by the block 426). The power state interrupt of block 426 may be generated by another component of the computing device 100, and may override or complement the process 400. In some embodiments, the power state interrupt of block 426 may be generated in response to keyboard, mouse and/or touchscreen activity. In some embodiments, the power state interrupt of block 426 may be generated in response to a software power up command. In some embodiments, the power state interrupt of block 426 may be generated in response to detection of I/O activity. Any one or more of these interrupt sources, or any other suitable interrupt sources, may cause the storage device 104 to change to the first power state from the second power state, independent of the execution of the process 400. Upon causing a change in the power state of the storage device 104 to the first power state at the operation 422, the control system 200 may return to the operation 402 and determine whether the storage device 104 is in the first power state.

FIG. 5 is a flow diagram of a process 500 for determining whether a proximity signal satisfies out-of-proximity criteria (e.g., the operation 406 of FIG. 4). The operations of the process 500 as described below may be performed by the transition logic 204 unless otherwise noted.

At the operation 502, the control system 200 may initialize a proximity check counter C. The proximity check counter C may be stored in the control memory 122, along with a maximum value CMAX. The proximity check counter C may keep track of the number of times the proximity signal is analyzed prior to generating the out-transition signal. In some embodiments, only a single check of the proximity signal may be included in the process 500, and therefore the proximity check counter C may not be stored or monitored.

At the operation 504, the control system 200 may determine a distance of the user from the proximity sensor 118. This determination may be based at least in part on the proximity signal generated by the proximity sensor 118 (e.g., as received by the receiver logic at the operation 404 of FIG. 4).

At the operation 506, the control system 200 may determine whether the distance determined at the operation 504 is greater than a threshold value associated with the check C. Different checks may be associated with different threshold distance values. For example, a first check of the proximity signal may require that a user be greater than 4 feet away from the computing device 100, while a second check of the proximity signal (evaluating a proximity signal received after the first check) may require that a user be greater than 8 feet away. Using different threshold values for different checks, in some embodiments, may allow the control system 200 to evaluate more complex patterns of user movement than a single distance threshold, which may allow the control system 200 to perform more intelligent control.

If the control system 200 determines at the operation 506 that the distance determined at the operation 504 is not greater than the threshold value, the control system 200 may determine that the proximity signal does not satisfy the out-of-proximity criteria and return a value of NO.

If the control system 200 determines at the operation 506 that the distance determined at the operation 504 is greater than the threshold value, the control system 200 may proceed to the operation 508 and determine whether the value of the check C is equal to the maximum value CMAX. If the value of the check C is equal to the maximum value CMAX, then no more checks of the proximity signal need be performed and the control system 200 may return a value of YES, indicating that the proximity signal satisfies the out-of-proximity criteria. If the value of the check C has not reached the maximum value CMAX, the control system 200 may increment the proximity check counter C at the operation 510.

The control system 200 may then activate a proximity timer (implemented by the timer logic 206) at the operation 512. At the operation 514, the control system 200 may determine whether the proximity timer activated at the operation 512 has reached a threshold value associated with the check C. As discussed above with reference to the operation 506, different checks may be associated with different threshold timer values. For example, a second check of the proximity signal may take place 3 seconds after a first check, while a third check of the proximity signal may take place 10 seconds after the second check. As discussed above with reference to different threshold distance values for different checks, using different threshold timer values for different checks may allow the control system 200 to evaluate more complex patterns of user movement. The control system 200 may continue to evaluate the proximity timer at the operation 514 until the threshold is reached.

If the control system 200 determines that the proximity timer has reached the threshold value associated with the check C, the control system 200 may proceed to the operation 516 and receive a proximity signal. The proximity signal may be received by the receiver logic 202, for example. In some embodiments, the proximity sensor 118 may generate the proximity signal in response to a trigger from the receiver logic 202 or the transition logic 204 (e.g., issued upon the proximity timer reaching the threshold).

Subsequent to receiving the proximity signal at the operation 516, the control system 200 may proceed to the operation 504 and determine the distance of the user from the proximity sensor 118 based at least in part on the proximity signal received at the operation 516. The process 500 may continue until the control system 200 determines that a user is not greater than a threshold distance away from the computing device 100 (e.g. as determined at the operation 506) or until the maximum number of checks CMAX has been performed and the user has been determined to be greater than the threshold distance away at each check.

FIG. 6 is a flow diagram of a process 600 for determining whether non-proximity out-transition criteria are satisfied (e.g., the operation 408 of FIG. 4). The operations of the process 600 as described below may be performed by the transition logic 204 unless otherwise noted.

At the operation 602, the control system 200 may activate an image timer. The image timer may be implemented by the timer logic 206. At the operation 604, the control system 200 may determine whether the image timer activated at the operation 602 has reached a threshold value. The control system 200 may continue to evaluate the image timer at the operation 604 until the threshold is reached.

If the control system 200 determines that the image timer has reached the threshold value, the control system 200 may proceed to the operation 606 and receive an image from the image capture device 120. The image may be received by the receiver logic 202, for example.

At the operation 608, the control system 200 may determine whether the image satisfies the out-of-image criteria. The operation 608 may be performed by the transition logic 204, for example. If the control system 200 determines at the operation 608 that the image satisfies the out-of-image criteria, the control system 200 may determine that the non-proximity out-transition criteria are satisfied and return a value of YES. If the control system determines at the operation 608 that the image does not satisfy the out-of-image criteria, the control system 200 may determine that the non-proximity out-transition criteria are not satisfied and return a value of NO.

Figure 7:
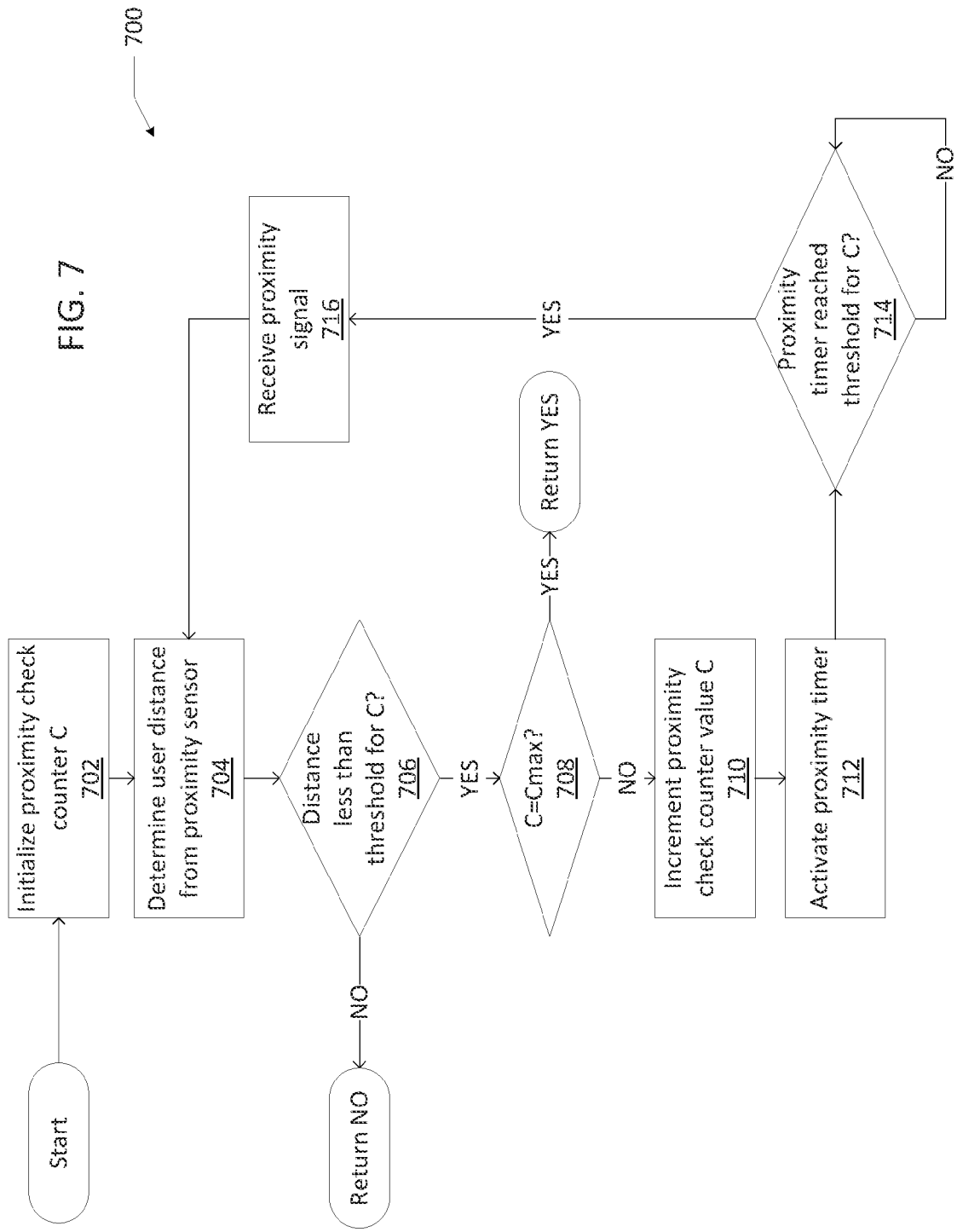
FIG. 7 is a flow diagram of a process for determining whether a proximity signal satisfies in-proximity criteria, in accordance with various embodiments.

FIG. 7 is a flow diagram of a process 700 for determining whether a proximity signal satisfies in-proximity criteria (e.g., the operation 416 of FIG. 4). The operations of the process 700 as described below may be performed by the transition logic 204 unless otherwise noted.

At the operation 702, the control system 200 may initialize a proximity check counter C. The proximity check counter C may be stored in the control memory 122, along with a maximum value CMAX, and may be substantially similar to the proximity check counter discussed above with reference to FIG. 5, but may be used to keep track of the number of times the proximity signal is analyzed prior to generating the in-transition signal.

At the operation 704, the control system 200 may determine a distance of the user from the proximity sensor 118. This determination may be based at least in part on the proximity signal generated by the proximity sensor 118 (e.g., as received by the receiver logic at the operation 414 of FIG. 4).

At the operation 706, the control system 200 may determine whether the distance determined at the operation 704 is less than a threshold value associated with the check C. As discussed above with reference to FIG. 5, different checks may be associated with different threshold distance values. For example, a first check of the proximity signal may require that a user be less than 6 feet away from the computing device 100, while a second check of the proximity signal (evaluating a proximity signal received after the first check) may require that a user be greater than 3 feet away.

If the control system 200 determines at the operation 706 that the distance determined at the operation 704 is not less than the threshold value, the control system 200 may determine that the proximity signal does not satisfy the in-proximity criteria and return a value of NO.

If the control system 200 determines at the operation 706 that the distance determined at the operation 704 is less than the threshold value, the control system 200 may proceed to the operation 708 and determine whether the value of the check C is equal to the maximum value CMAX. If the value of the check C is equal to the maximum value CMAX, then no more checks of the proximity signal need be performed and the control system 200 may return a value of YES, indicating that the proximity signal satisfies the in-proximity criteria. If the value of the check C has not reached the maximum value CMAX, the control system 200 may increment the proximity check counter C at the operation 710.

The control system 200 may then activate a proximity timer (implemented by the timer logic 206) at the operation 712. At the operation 714, the control system 200 may determine whether the proximity timer activated at the operation 712 has reached a threshold value associated with the check C. As discussed above with reference to FIG. 5, different checks may be associated with different threshold timer values. For example, a second check of the proximity signal may take place 3 seconds after a first check, while a third check of the proximity signal may take place 1 second after the second check. The control system 200 may continue to evaluate the proximity timer at the operation 714 until the threshold is reached.

If the control system 200 determines that the proximity timer has reached the threshold value associated with the check C, the control system 200 may proceed to the operation 716 and receive a proximity signal. The proximity signal may be received by the receiver logic 202, for example. In some embodiments, the proximity sensor 118 may generate the proximity signal in response to a trigger from the receiver logic 202 or the transition logic 204 (e.g., issued upon the proximity timer reaching the threshold).

Subsequent to receiving the proximity signal at the operation 716, the control system 200 may proceed to the operation 704 and determine the distance of the user from the proximity sensor 118 based at least in part on the proximity signal received at the operation 716. The process 700 may continue until the control system 200 determines that a user is not less than a threshold distance away from the computing device 100 (e.g. as determined at the operation 706) or until the maximum number of checks CMAX has been performed and the user has been determined to be less than the threshold distance away at each check.

Figure 8:
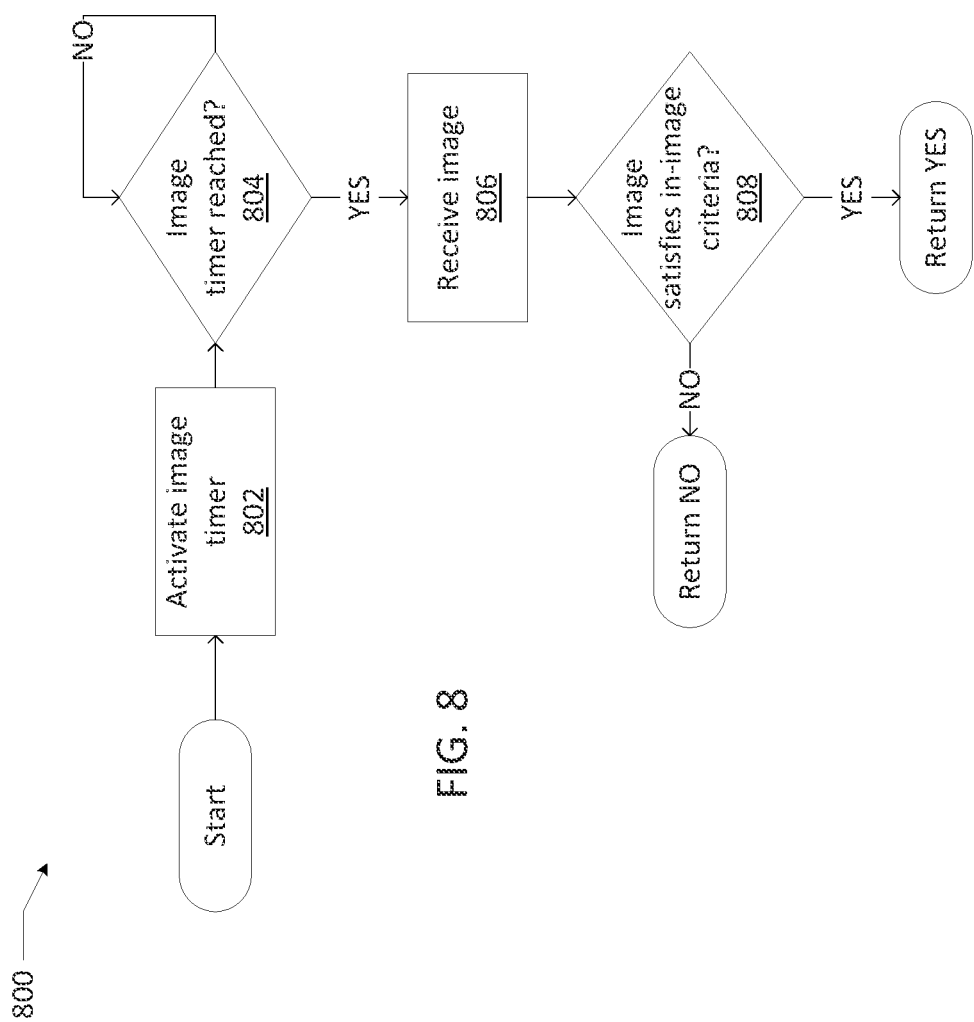
FIG. 8 is a flow diagram of a process for determining whether non-proximity in transition criteria are satisfied, in accordance with various embodiments.

FIG. 8 is a flow diagram of a process 800 for determining whether non-proximity in transition criteria are satisfied (e.g., the operation 418 of FIG. 4). The operations of the process 800 as described below may be performed by the transition logic 204 unless otherwise noted.

At the operation 802, the control system 200 may activate an image timer. The image timer may be implemented by the timer logic 206. At the operation 804, the control system 200 may determine whether the image timer activated at the operation 802 has reached a threshold value. The control system 200 may continue to evaluate the image timer at the operation 804 until the threshold is reached.

If the control system 200 determines that the image timer has reached the threshold value, the control system 200 may proceed to the operation 806 and receive an image from the image capture device 120. The image may be received by the receiver logic 202, for example.

At the operation 808, the control system 200 may determine whether the image satisfies the in-image criteria. The operation 808 may be performed by the transition logic 204, for example. If the control system 200 determines at the operation 808 that the image satisfies the in-image criteria, the control system 200 may determine that the non-proximity in transition criteria are satisfied and return a value of YES. If the control system determines at the operation 808 that the image does not satisfy the in-image criteria, the control system 200 may determine that the non-proximity in transition criteria are not satisfied and return a value of NO.

FIG. 9 illustrates various criteria that may be used by the control system 200 in generating an out- or in-transition signal, in accordance with various embodiments. The criteria illustrated in FIG. 9 may be stored, for example, in the control memory 122 may be accessed by the processing device 102 when performing storage device power state control operations as described herein. In particular, FIG. 9 illustrates two sets of criteria that may be used in generating an out-transition signal (the sets 902 and 904) and one set of criteria that may be used in generating an in-transition signal (the set 906). The particular power states depicted in FIG. 9 are simply illustrative, and any suitable power states may be used.

The set 902 may govern the transition of the HDD 112 from an "ACTIVE" power state (which may serve as the "first" power state discussed above with reference to FIGS. 4 through 8) to a "STANDBY" power state (which may serve as the "second" power state discussed above). The set 902 may include out-of-proximity criteria, which may include three proximity checks, as discussed above with reference to FIG. 5. Each proximity check may be associated with a timer threshold, as discussed above with reference to the operations 512 and 514 of FIG. 5. As illustrated in FIG. 9, the set 902 may specify a timer threshold of "0 seconds" for the first check; this may correspond to embodiments in which the first check commences with the proximity signal received at the operation 406 of FIG. 4. Although the timer thresholds of the set 902 are different for each of the three checks (here, 0 seconds, 5 seconds and 10 seconds), this need not be the case. The set 902 may also include a distance threshold for each of the three checks, as discussed above with reference to the operation 506 of FIG. 5. As noted above with reference to the timer threshold of the set 902, the distance thresholds of the set 902 (2 feet, 4 feet and 6 feet, respectively) need not be different for each of the three checks. The set 902 may include a placeholder for out-of-image criteria, but as shown in FIG. 9, no out-of-image criteria may be specified for the transition from the "ACTIVE" power state to the "STANDBY" power state. The set 902 may also include other non-proximity criteria; as illustrated in FIG. 9, these criteria may include no keyboard activity during a monitoring period (e.g., the period required for execution of the operation 404 of FIG. 4). As discussed above, in some embodiments, non-proximity criteria may affect the power state of the storage device 104 via a power state interrupt (e.g., the power state interrupt 424 of FIG. 4).

The set 904 may govern the transition of the HDD 112 from a "STANDBY" power state (which may serve as the "first" power state discussed above with reference to FIGS. 4 through 8) to an "OFF" power state (which may serve as the "second" power state discussed above). Note that, in the embodiment illustrated in FIG. 9, the computing device 100 may make two possible transitions from a higher power state to a lower power state (e.g., the transition from "ACTIVE" to "STANDBY" in the transition from "STANDBY" to "OFF"). In some embodiments, the control system 200 may be configured with only one possible transition from a higher power state to a lower power state (e.g., the transition from "ACTIVE" to "OFF").

The set 904 may include out-of-proximity criteria, which may include one proximity check, as discussed above with reference to FIG. 5. The proximity check may be associated with a timer threshold, of "0," which, as discussed above with reference to the set 902, may correspond to embodiments in which the first check commences with the proximity signal received at the operation 406 of FIG. 4. The set 904 may include a distance threshold for the proximity check. The set 904 may include out-of-image criteria, which may include a single image check (e.g., as discussed above with reference to FIG. 6) associated with an image timer threshold of five seconds. The out-of-image criteria may also specify an image processing technique that is to be used to determine whether or not the image satisfies out-of-image criteria or not. The technique illustrated for the set 904 of FIG. 9 is a color detection technique, which determines whether a predominant color associated with the user (e.g., the color and/or pattern of a user's shirt or hat) is present in the image (indicating that the user is proximate to, and likely using, the computing device 100). Other image processing techniques may be used instead of or in addition to a color detection technique, as discussed elsewhere herein. The set 904 may also include other non-proximity criteria, such as no keyboard activity during a monitoring period, as discussed above with reference to the set 902.

The set 906 may govern the transition of the HDD 112 from a "OFF" power state (which may serve as the "second" power state discussed above with reference to FIGS. 4 through 8) to an "ACTIVE" power state (which may serve as the "first" power state discussed above). The set 906 may include in-proximity criteria, which may include one proximity check, as discussed above with reference to FIG. 5. The proximity check may be associated with a timer threshold, of "0," which may correspond to embodiments in which the first check commences with the proximity signal received at the operation 416 of FIG. 4. The set 906 may include a distance threshold of 8 feet for the proximity check (e.g., as discussed above with reference to FIG. 7). The set 906 may include in-image criteria, which may include a single image check (e.g., as discussed above with reference to FIG. 8) associated with an image timer threshold of one second. The in-image criteria may also specify an image processing technique that is to be used to determine whether or not the image satisfies out-of-image criteria or not. The technique illustrated for the set 906 of FIG. 9 is a face recognition technique, which analyzes the image and determines whether a set of facial features of the user (e.g., stored in the control memory 122) are present in the image (indicating that the user is proximate to, and likely using, the computing device 100). As discussed above with reference to the set 904, other image processing techniques may be used instead of or in addition to a face recognition technique, as discussed elsewhere herein. The set 906 may also include other non-proximity criteria, such as keyboard, mouse or touchscreen activity during a monitoring period, as discussed above with reference to the set 902. The sets 902, 904 and 906 are simply illustrative in any desired criteria or combination of criteria may be implemented in the control system 200.

In some embodiments, the distance thresholds, timer thresholds, and other criteria used by the control system 200 to determine whether to generate an in- or out-transition signal may be dynamically adapted based on the history of the user's interactions with the computing device 100. For example, if the computing device 100 is idle every day between 12:00 PM and 1:00 PM, a threshold for a proximity timer applied near or during that period may be made smaller than a threshold for proximity timer at other times of day because it is very likely that once the user is first detected to be out of proximity of the computing device 100 he or she will remain out of proximity and therefore the storage device 104 may be transitioned to a lower power state. Thus, the threshold for the proximity timer may itself be a function of the absolute system time. In another example, if the computing device 100 is idle during time intervals which correspond to a meeting or event for which the user received an electronic calendar invitation with a different location than the location of the computing device 100, the control system 200 may adapt to reduce the proximity timer threshold for proximity timers applied near or during periods corresponding to such calendar invitations. In another example, if the computing device 100 is idle for five minutes after each email from a particular individual, the control system 200 may adapt to reduce the proximity timer threshold for proximity timers applied soon after the receipt of such emails. In another example, the control system 200 may monitor an average idle time for the computing device 100, and may scale the thresholds used for various criteria in accordance with this average idle time (e.g., using thresholds equal to a multiple of the average idle time). The control system 200 may be configured with any suitable machine learning technique, which may use history data such as that described above (which may be stored, for example, in the control memory 122) to adjust the criteria used in determining whether to generate an in- or out-transition signal in order to minimize power consumption.

In some embodiments, the computing device 100 may implement the proximity detection systems and techniques disclosed herein as an application programming interface (API) which may be utilized by any suitable device driver to determine whether a user is in proximity to the computing device 100 and adapt the operation of the device accordingly.

Figure 10:
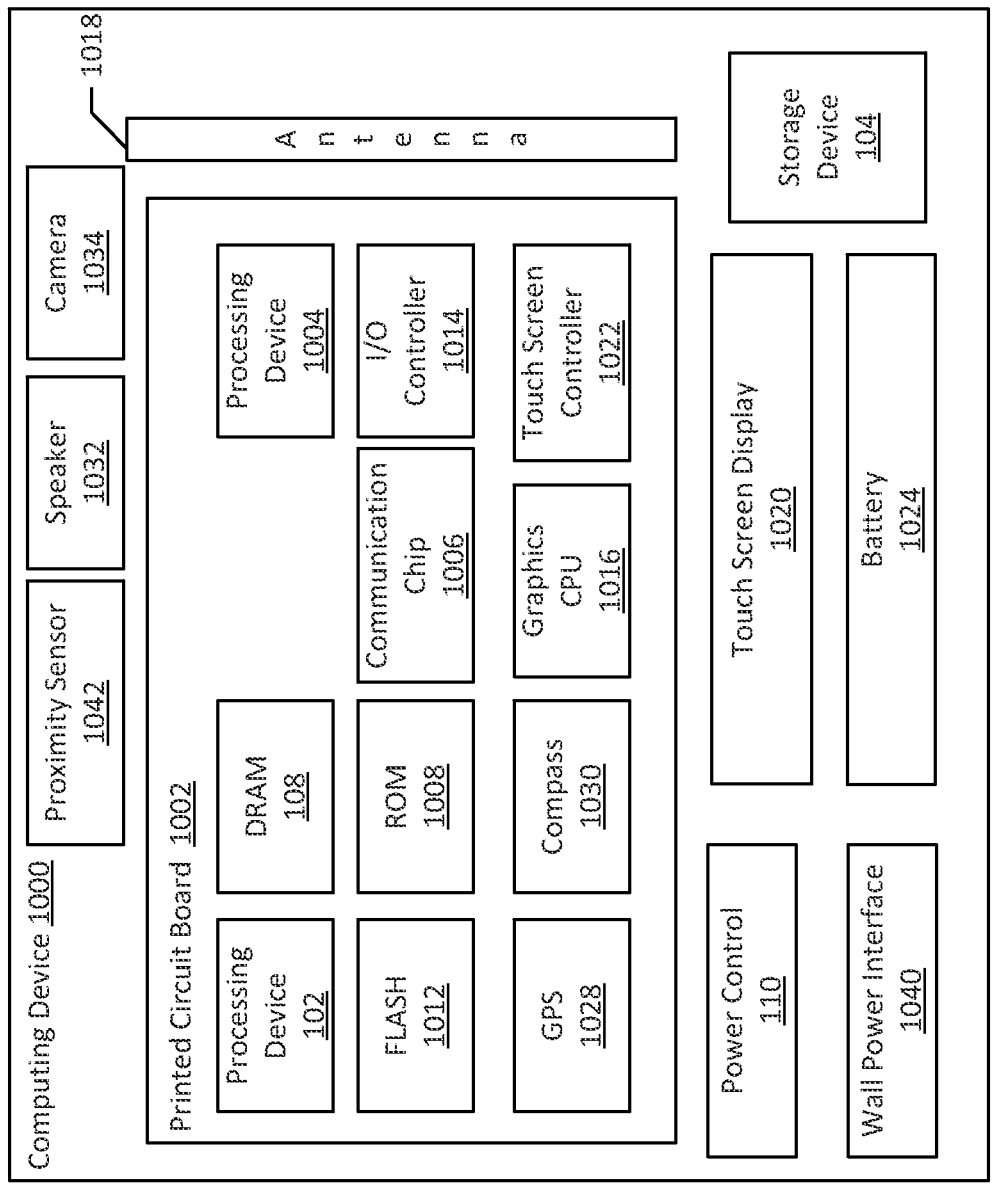
FIG. 10 illustrates an example computing device in which systems and devices, such as the computing device of FIG. 1 and the control system of FIG. 2, may be incorporated, in accordance with various embodiments.

FIG. 10 illustrates an example computing device 1000 in which systems and devices, such as the earlier described computing device 100 and the control system 200, may be incorporated, in accordance with various embodiments. The computing device 1000 may include a number of components, one or more additional processing devices 1004, and at least one communication chip 1006.

In various embodiments, the one or more processing devices 102 and 1004 each may include one or more processor cores. In various embodiments, the at least one communication chip 1006 may be physically and electrically coupled to the one or more processing devices 102 and 1004. In further implementations, the communication chip 1006 may be part of the one or more processing devices 102 and 1004. In various embodiments, the computing device 1000 may include a printed circuit board (PCB) 1002. For these embodiments, the one or more processing devices 102 and 1004 and communication chip 1006 may be disposed thereon. In alternate embodiments, the various components may be coupled without the employment of the PCB 1002.

Depending on its applications, the computing device 1000 may include other components that may or may not be physically and electrically coupled to the PCB 1002. These other components include, but are not limited to, volatile memory (e.g., the DRAM 108), non-volatile memory such as ROM 1008 or the storage device 104, an I/O controller 1014, a digital signal processor (not shown), a crypto processor (not shown), a graphics processor 1016, one or more antennas 1018, a display (not shown), a touch screen display 1020, a touch screen controller 1022, a battery 1024, an audio codec (not shown), a video codec (not shown), a global positioning system (GPS) device 1028, a compass 1030, an accelerometer (not shown), a gyroscope (not shown), a speaker 1032, a camera 1034 (which may serve as the image capture device 120), a proximity sensor 1042 (which may serve as the proximity sensor 118), a power control device 110, a wall power interface 1040 (to convert and manage AC power delivered from a wall outlet or other source), and so forth. In various embodiments, the processing device 102 and/or the processing device 1004 may be integrated on the same die with other components to form an SoC, as discussed above with reference to FIG. 1. In some embodiments, one or both of the DRAM 108 and/or the ROM 1008 may be or may include a cross-point nonvolatile memory.

In various embodiments, the computing device 1000 may include resident persistent or nonvolatile memory, e.g., the flash memory 1012. In some embodiments, the one or more processing devices 102 and 1004 and/or the flash memory 1012 may include associated firmware (not shown) storing programming instructions configured to enable the computing device 1000, in response to execution of the programming instructions by one or more processing devices 102 and 1004 to practice all or selected aspects of the control systems and processes disclosed herein. In various embodiments, these aspects may additionally or alternatively be implemented using hardware separate from the one or more processing devices 102 and 1004.

The communication chip 1006 may enable wired and/or wireless communications for the transfer of data to and from the computing device 1000. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 1006 may implement any of a number of wireless standards or protocols, including but not limited to IEEE 802.20, General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Bluetooth, derivatives thereof, as well as any other wireless protocols that are designated as 3G, 4G, 5G, and beyond. The computing device 1000 may include a plurality of communication chips 1006. For instance, a first communication chip 1006 may be dedicated to shorter range wireless communications such as Wi-Fi and Bluetooth and a second communication chip 1006 may be dedicated to longer range wireless communications such as GPS, EDGE, GPRS, CDMA, WiMAX, LTE, Ev-DO, and others.

In various implementations, the computing device 1000 may be a laptop, a netbook, a notebook, an ultrabook, a smartphone, a computing tablet, a personal digital assistant (PDA), an ultra-mobile PC, a mobile phone, a desktop computer, a server, a printer, a scanner, a monitor, a set-top box, an entertainment control unit (e.g., a gaming console), a digital camera, a portable music player, or a digital video recorder. In further implementations, the computing device 1000 may be any other electronic device that processes data.

Computer readable media (including non-transitory computer readable media), methods, systems and devices for performing the above-described techniques are illustrative examples of embodiments disclosed herein. For example, the control memory 122 (FIG. 1) may include assembler instructions supported by the processing device 102, or may include instructions in a high-level language, such as C, that can be compiled by the processing device 102. In some embodiments, a permanent copy of the computer readable instructions may be placed into permanent storage in the control memory 122 in the factory or in the field (through, for example, a machine-accessible distribution medium (not shown), such as a compact disc). In some embodiments, a permanent copy of the computer readable instructions may be placed into permanent storage in the control memory 122 through a communication interface (e.g., from a distribution server).

Various examples of embodiments of the present disclosure are provided in the following paragraphs. Example 1 is a control system for a storage device of a computing device, including: receiver logic to receive a proximity signal from a proximity sensor of the computing device, the proximity signal indicative of a distance of a user from the proximity sensor in a proximity sensor coverage area, wherein the proximity sensor generates the proximity signal based at least in part on a receipt of electromagnetic radiation reflected off or radiated from the user; transition logic, coupled to the receiver logic, to determine that the proximity signal satisfies out-of-proximity criteria, and generate an out-transition signal based at least in part on the determination that the proximity signal satisfies the out-of-proximity criteria; and state-change logic, coupled to the transition logic, to cause a change in a power state of the storage device from a first power state to a second power state, based at least in part on the out-transition signal, wherein the storage device consumes less power in the second power state than in the first power state.

Example 2 may include the subject matter of Example 1, and may further specify that the proximity sensor is an infrared sensor.

Example 3 may include the subject matter of any of Examples 1-2, and may further specify that determine that the proximity signal satisfies out-of-proximity criteria includes determine that a user is located at a distance farther than a threshold distance from the proximity sensor.

Example 4 may include the subject matter of any of Examples 1-3, and may further include timer logic, coupled to the transition logic, to activate a proximity timer based at least in part on the determination that the proximity signal satisfies the out-of-proximity criteria, wherein the transition logic is to generate the out-transition signal based at least in part on the proximity timer reaching a threshold value.

Example 5 may include the subject matter of any of Examples 1-4, and may further specify that: the receiver logic is to receive an image of an image capture coverage area from an image capture device; and the transition logic is to determine that the image satisfies out-of-image criteria, and generate the out-transition signal based at least in part on the determination that the image satisfies the out-of-image criteria.

Example 6 may include the subject matter of Example 5, and may further specify that the image capture coverage area overlaps with the proximity sensor coverage area.

Example 7 may include the subject matter of any of Examples 5-6, and may further include timer logic, coupled to the transition logic, to activate an image timer based at least in part on the determination that the proximity signal satisfies the out-of-proximity criteria, wherein the image capture device is to capture the image in response to the image timer reaching a threshold value.

Example 8 may include the subject matter of any of Examples 1-7, and may further specify that: the transition logic is to determine that the proximity signal satisfies in-proximity criteria, and generate an in-transition signal based at least in part on the determination that the proximity signal satisfies the in-proximity criteria; and the state-change logic is to cause a change in a power state of the storage device from the second power state to the first power state, in response to the in-transition signal.

Example 9 may include the subject matter of any of Examples 1-8, and may further specify that the storage device is a hard disk drive.

Example 10 is a control system for a storage device of a computing device, including: receiver logic to receive a proximity signal from a non-contact proximity sensor in the computing device, the proximity signal indicative of a distance of a user from the proximity sensor in a proximity sensor coverage area, wherein the proximity sensor is to sense a physical presence of the user; transition logic, coupled to the receiver logic, to determine that the proximity signal satisfies in-proximity criteria, and generate an in-transition signal based at least in part on the determination that the proximity signal satisfies the in-proximity criteria; and state-change logic, coupled to the transition logic, to cause a change in a power state of the storage device from a second power state to a first power state, based at least in part on the in-transition signal, wherein the storage device consumes less power in the second power state than in the first power state.

Example 11 may include the subject matter of Example 10, and may further specify that: the receiver logic is to receive an image of an image capture coverage area from an image capture device; and the transition logic is to determine that the image satisfies in-image criteria, and generate the in-transition signal based at least in part on the determination that the image satisfies the in-image criteria.

Example 12 may include the subject matter of Example 11, and may further specify that the in-image criteria includes detecting a particular color or pattern in the image capture coverage area.

Example 13 may include the subject matter of any of Examples 11-12, and may further specify that: the image capture device is to capture images at a first resolution and a second resolution, the first resolution lower than the second resolution; and the image received at the receiver logic is at the first resolution.

Example 14 may include the subject matter of any of Examples 10-13, and may further specify that the proximity sensor generates the proximity signal without wirelessly communicating with an electronic device possessed by the user.

Example 15 is one or more computer readable media including computer readable instructions which, when executed by one or more processing devices of a computing device, cause the computing device to: receive a proximity signal from a proximity sensor of the computing device, the proximity signal indicative of a distance of a user from the proximity sensor in a proximity sensor coverage area, wherein the proximity sensor generates the proximity signal based at least in part on a receipt of electromagnetic radiation reflected off or radiated from the user; determine that the proximity signal satisfies out-of-proximity criteria; generate an out-transition signal based at least in part on the determination that the proximity signal satisfies the out-of-proximity criteria; and cause a change in a power state of the storage device from a first power state to a second power state, based at least in part on the out-transition signal, wherein the storage device consumes less power in the second power state than in the first power state.

Example 16 may include the subject matter of Example 15, and may further specify that the proximity sensor is an infrared sensor.

Example 17 may include the subject matter of any of Examples 15-16, and may further include instructions which, when executed by the one or more processing devices, cause the computing device to activate a proximity timer based at least in part on the determination that the proximity signal satisfies the out-of-proximity criteria, wherein the transition logic is to generate the out-transition signal based at least in part on the proximity timer reaching a threshold value.

Example 18 may include the subject matter of any of Examples 15-17, further including instructions which, when executed by the one or more processing devices, cause the computing device to: receive an image of an image capture coverage area from an image capture device; determine that the image satisfies out-of-image criteria; and generate the out-transition signal based at least in part on the determination that the image satisfies the out-of-image criteria.

Example 19 may include the subject matter of Example 18, and may further include instructions which, when executed by the one or more processing devices, cause the computing device to activate an image timer based at least in part on the determination that the proximity signal satisfies the out-of-proximity criteria, wherein the image capture device is to capture the image in response to the image timer reaching a threshold value.

Example 20 may include the subject matter of any of Examples 15-19, and may further include instructions which, when executed by the one or more processing devices, cause the computing device to: determine that the proximity signal satisfies in-proximity criteria; generate an in-transition signal based at least in part on the determination that the proximity signal satisfies the in-proximity criteria; and cause a change in a power state of the storage device from the second power state to the first power state, in response to the in-transition signal.

Example 21 may include the subject matter of any of Examples 15-20, and may further specify that the storage device is a hard disk drive.

Example 22 is one or more computer readable media which, when executed by one or more processing devices of a computing device, cause the computing device to: receive a proximity signal from a non-contact proximity sensor in the computing device, the proximity signal indicative of a distance of a user from the proximity sensor in a proximity sensor coverage area, wherein the proximity sensor is to sense a physical presence of the user; determine that the proximity signal satisfies in-proximity criteria; generate an in-transition signal based at least in part on the determination that the proximity signal satisfies the in-proximity criteria; and cause a change in a power state of the storage device from a second power state to a first power state, based at least in part on the in-transition signal, wherein the storage device consumes less power in the second power state than in the first power state.

Example 23 may include the subject matter of Example 22, and may further include instructions which, when executed by the one or more processing devices, cause the computing device to: receive an image of an image capture coverage area from an image capture device; determine that the image satisfies in-image criteria; and generate the in-transition signal based at least in part on the determination that the image satisfies the in-image criteria.

Example 24 may include the subject matter of Example 23, and may further specify that: the image capture device is to capture images at a first resolution and a second resolution, the first resolution lower than the second resolution; and the image received is at the first resolution.

Example 25 may include the subject matter of any of Examples 22-24, and may further specify that the proximity sensor generates the proximity signal without wirelessly communicating with an electronic device possessed by the user.

Example 26 is a method for controlling a storage device of a computing device, including: receiving a proximity signal from a proximity sensor of the computing device, the proximity signal indicative of a distance of a user from the proximity sensor in a proximity sensor coverage area, wherein the proximity sensor generates the proximity signal based on the receipt of electromagnetic radiation reflected off the user's body; determining that the proximity signal satisfies out-of-proximity criteria; generating an out-transition signal based at least in part on the determination that the proximity signal satisfies the out-of-proximity criteria; and causing a change in a power state of the storage device from a first power state to a second power state, based at least in part on the out-transition signal, wherein the storage device consumes less power in the second power state than in the first power state.

Example 27 may include the subject matter of Example 26, and may further specify that the proximity sensor is an infrared sensor.

Example 28 may include the subject matter of any of Examples 26-27, and may further specify that determining that the proximity signal satisfies out-of-proximity criteria comprises determining that a user is located at a distance farther than a threshold distance from the proximity sensor.

Example 29 may include the subject matter of any of Examples 26-28, and may further include activating a proximity timer based at least in part on the determination that the proximity signal satisfies the out-of-proximity criteria, wherein generating the out-transition signal is based at least in part on the proximity timer reaching a threshold value.

Example 30 may include the subject matter of any of Examples 26-29, and may further include: receiving an image of an image capture coverage area from an image capture device; determining that the image satisfies out-of-image criteria; and generating the out-transition signal based at least in part on the determination that the image satisfies the out-of-image criteria.

Example 31 may include the subject matter of Example 30, and may further specify that the image capture coverage area overlaps with the proximity sensor coverage area.

Example 32 may include the subject matter of any of Examples 30-31, and may further include activating an image timer based at least in part on determining that the proximity signal satisfies the out-of-proximity criteria, wherein the image capture device is to capture the image in response to the image timer reaching a threshold value.

Example 33 may include the subject matter of any of Examples 26-32, and may further include: determining that the proximity signal satisfies in-proximity criteria; generating an in-transition signal based at least in part on the determination that the proximity signal satisfies the in-proximity criteria; and causing a change in a power state of the storage device from the second power state to the first power state, in response to the in-transition signal.

Example 34 may include the subject matter of any of Examples 26-33, and may further specify that the storage device is a hard disk drive.

Example 35 is a method for controlling a storage device of a computing device, comprising: receiving a proximity signal from a non-contact proximity sensor in the computing device, the proximity signal indicative of a distance of a user from the proximity sensor in a proximity sensor coverage area, wherein the proximity sensor is to sense the physical body of the user; determining that the proximity signal satisfies in-proximity criteria; generating an in-transition signal based at least in part on the determination that the proximity signal satisfies the in-proximity criteria; and causing a change in a power state of the storage device from a second power state to a first power state, based at least in part on the in-transition signal, wherein the storage device consumes less power in the second power state than in the first power state.

Example 36 may include the subject matter of Example 35, and may further include: receiving an image of an image capture coverage area from an image capture device; determining that the image satisfies in-image criteria; and generating the in-transition signal based at least in part on determining that the image satisfies the in-image criteria.

Example 37 may include the subject matter of Example 36, and may further specify that the in-image criteria includes detecting a particular color or pattern in the image capture coverage area.

Example 38 may include the subject matter of any of Examples 36-37, and may further specify that: the image capture device is to capture images at a first resolution and a second resolution, the first resolution lower than the second resolution; and the image received at the receiver logic is at the first resolution.

Example 39 may include the subject matter of any of Examples 35-38, and may further specify that the proximity sensor generates the proximity signal without wirelessly communicating with an electronic device in the user's possession.

Example 40 is one or more computer readable media which, when executed by one or more processing devices of a computing device, cause the computing device to perform the method of any of Examples 26-39.

Example 41 is a computing device comprising means for performing the method of any of Examples 26-39.

What is claimed is:

1. A control system for a storage device of a computing device, comprising:
    receiver logic to receive a proximity signal from a proximity sensor of the computing device, the proximity signal indicative of a distance of a user from the proximity sensor in a proximity sensor coverage area, wherein the proximity sensor is to generate the proximity signal based at least in part on a receipt of electromagnetic radiation reflected off or radiated from the user;
    transition logic, coupled to the receiver logic, to:
        determine that the proximity signal satisfies out-of-proximity criteria, and
        generate an out-transition signal based at least in part on the determination that the proximity signal satisfies the out-of-proximity criteria; and
    state-change logic, coupled to the transition logic, to cause a change in a power state of the storage device from a first power state to a second power state, based at least in part on the out-transition signal, wherein the storage device consumes less power in the second power state than in the first power state, wherein the transition logic is further to determine that the proximity signal satisfies an in-proximity criteria and wherein the in-proximity criteria includes a criterion that allows for a distance of the in-proximity criteria to overlap with a distance of the out-of-proximity criteria.

2. The control system of claim 1, wherein the proximity sensor is an infrared sensor.

3. The control system of claim 1, wherein to determine that the proximity signal satisfies the out-of-proximity criteria the transition logic is to determine that a user is located at a distance farther than a threshold distance from the proximity sensor.

4. The control system of claim 1, further comprising:
    timer logic, coupled to the transition logic, to activate a proximity timer based at least in part on the determination that the proximity signal satisfies the out-of-proximity criteria;
    wherein the transition logic is to generate the out-transition signal based at least in part on the proximity timer reaching a threshold value.

5. The control system of claim 1, wherein:
    the receiver logic is to receive an image of an image capture coverage area from an image capture device; and
    the transition logic is to:
        determine that the image satisfies the out-of-image criteria, and
        generate the out-transition signal based at least in part on the determination that the image satisfies the out-of-image criteria.

6. The control system of claim 5, wherein the image capture coverage area overlaps with the proximity sensor coverage area.

7. The control system of claim 5, further comprising:
    timer logic, coupled to the transition logic, to activate an image timer based at least in part on the determination that the proximity signal satisfies the out-of-proximity criteria;
    wherein the image capture device is to capture the image in response to the image timer reaching a threshold value.

8. The control system of claim 1, wherein:
    the transition logic is to:
        determine that the proximity signal satisfies the in-proximity criteria, and
        generate an in-transition signal based at least in part on the determination that the proximity signal satisfies the in-proximity criteria; and
    the state-change logic is to cause a change in a power state of the storage device from the second power state to the first power state, in response to the in-transition signal.

9. The control system of claim 1, wherein the storage device is a hard disk drive.

10. The control system of claim 1, wherein to determine that the proximity signal satisfies the in-proximity criteria comprises the transition logic is to determine that a user is located at a distance less than a threshold distance away from the proximity sensor.

11. The control system of claim 1, wherein the distance of the in-proximity criteria includes a distance of the user from the proximity sensor that is 8 feet or less while the out-of-proximity criteria includes a distance of the user from the proximity sensor that is 6 feet or greater.

12. The control system of claim 1, wherein the storage device comprises a first storage device and the state-change logic is to cause the change in the power state of the first storage device independently of a power management mode implemented by an operating system of the computing device that controls a power state of a second storage device.

13. The control system of claim 1, wherein a distance of the in-proximity criteria is non-complementary to a distance of the out-of-proximity criteria.

14. A control system for a storage device of a computing device, comprising:
  receiver logic to receive a proximity signal from a non-contact proximity sensor in the computing device, the proximity signal indicative of a distance of a user from the proximity sensor in a proximity sensor coverage area, wherein the proximity sensor is to sense a physical presence of the user;
  transition logic, coupled to the receiver logic, to:
    determine that the proximity signal satisfies an in-proximity criteria, and
    generate an in-transition signal based at least in part on the determination that the proximity signal satisfies the in-proximity criteria; and
  state-change logic, coupled to the transition logic, to cause a change in a power state of the storage device from a second power state to a first power state, based at least in part on the in-transition signal, wherein the storage device consumes less power in the second power state than in the first power state, wherein the transition logic is further to determine that the proximity signal satisfies an out-of-proximity criteria and wherein the out-of-proximity criteria includes a criterion that allows for a distance of the out-of-proximity criteria to overlap with a distance of the in-proximity criteria.

15. The control system of claim 14, wherein:
  the receiver logic is to receive an image of an image capture coverage area from an image capture device; and
  the transition logic is to:
    determine that the image satisfies in-image criteria, and
    generate the in-transition signal based at least in part on the determination that the image satisfies the in-image criteria.

16. The control system of claim 15, wherein the in-image criteria comprises detection of particular color or pattern in the image capture coverage area.

17. The control system of claim 15, wherein:
  the image capture device is to capture images at a first resolution and a second resolution, the first resolution lower than the second resolution; and
  the image received at the receiver logic is at the first resolution.

18. The control system of claim 14, wherein the proximity sensor is to generate the proximity signal without wireless communication with an electronic device possessed by the user.

19. One or more non-transitory computer-readable media embodied thereon, computer-readable instructions which, when executed by one or more processing devices of a computing device, cause the computing device to:
  receive a proximity signal from a proximity sensor of the computing device, the proximity signal indicative of a distance of a user from the proximity sensor in a proximity sensor coverage area, wherein the proximity sensor is to generate the proximity signal based at least in part on a receipt of electromagnetic radiation reflected off or radiated from the user;
  determine that the proximity signal satisfies out-of-proximity criteria;
  generate an out-transition signal based at least in part on the determination that the proximity signal satisfies the out-of-proximity criteria; and
  cause a change in a power state of a storage device from a first power state to a second power state, based at least in part on the out-transition signal, wherein the storage device is to consume less power in the second power state than in the first power state, wherein the out-of-proximity criteria comprises a first criteria and an in-proximity criteria comprises a second criteria and wherein the first and the second criteria include criterion that allows for a distance of the first criteria and a distance of the second criteria to overlap.

20. The one or more computer readable media of claim 19, wherein the proximity sensor is an infrared sensor.

21. The one or more computer readable media of claim 19, further comprising instructions which, when executed by the one or more processing devices, cause the computing device to:
  activate a proximity timer based at least in part on the determination that the proximity signal satisfies the out-of-proximity criteria;
  wherein the out-transition signal is generated based at least in part on the proximity timer reaching a threshold value.

22. The one or more computer readable media of claim 19, further comprising instructions which, when executed by the one or more processing devices, cause the computing device to:
  receive an image of an image capture coverage area from an image capture device;
  determine that the image satisfies out-of-image criteria; and
  generate the out-transition signal based at least in part on the determination that the image satisfies the out-of-image criteria.

23. The one or more computer readable media of claim 22, further comprising instructions which, when executed by the one or more processing devices, cause the computing device to:
  activate an image timer based at least in part on the determination that the proximity signal satisfies the out-of-proximity criteria;
  wherein the image capture device is to capture the image in response to the image timer reaching a threshold value.

24. The one or more computer readable media of claim 19, further comprising instructions which, when executed by the one or more processing devices, cause the computing device to:
  determine that the proximity signal satisfies in-proximity criteria;
  generate an in-transition signal based at least in part on the determination that the proximity signal satisfies the in-proximity criteria; and
  cause a change in a power state of the storage device from the second power state to the first power state, in response to the in-transition signal.

25. The one or more computer readable media of claim 19, wherein the storage device is a hard disk drive.

26. One or more non-transitory computer-readable media embodied thereon, computer-readable instructions which, when executed by one or more processing devices of a computing device, cause the computing device to:

receive a proximity signal from a non-contact proximity sensor in the computing device, the proximity signal indicative of a distance of a user from the proximity sensor in a proximity sensor coverage area, wherein the proximity sensor is to sense a physical presence of the user;

determine that the proximity signal satisfies an in-proximity criteria;

generate an in-transition signal based at least in part on the determination that the proximity signal satisfies the in-proximity criteria; and cause a change in a power state of the storage device from a second power state to a first power state, based at least in part on the in-transition signal, wherein the storage device consumes less power in the second power state than in the first power state, wherein the in-proximity criteria comprises a first criteria and an out-of-proximity criteria comprises a second criteria and wherein the first and the second criteria include criterion that allows for a distance of the first criteria and a distance of the second criteria to overlap.

27. The one or more computer-readable media of claim 26, further comprising instructions which, when executed by the one or more processing devices, cause the computing device to:

receive an image of an image capture coverage area from an image capture device;

determine that the image satisfies in-image criteria; and generate the in-transition signal based at least in part on the determination that the image satisfies the in-image criteria.

28. The one or more computer computer-readable media of claim 27, wherein:

the image capture device is to capture images at a first resolution and a second resolution, the first resolution lower than the second resolution; and the image received is at the first resolution.

29. The one or more computer-readable media of claim 26, wherein the proximity sensor generates the proximity signal without wireless communication with an electronic device possessed by the user.

* * * * *